US012545793B2

(12) United States Patent
Abidian et al.

(10) Patent No.: US 12,545,793 B2
(45) Date of Patent: Feb. 10, 2026

(54) CONDUCTING POLYMER MICROCONTAINERS FOR ORGANIC BIOELECTRONICS AND DRUG DELIVERY

(71) Applicant: University of Houston System, Houston, TX (US)

(72) Inventors: Mohammad Reza Abidian, Houston, TX (US); Martin Antensteiner, Houston, TX (US); Milad Khorrami, Houston, TX (US)

(73) Assignee: University of Houston System, Houston, TX (US)

( * ) Notice: Subject to any disclaimer, the term of this patent is extended or adjusted under 35 U.S.C. 154(b) by 1600 days.

(21) Appl. No.: 16/640,978

(22) PCT Filed: Aug. 22, 2018

(86) PCT No.: PCT/US2018/047565
§ 371 (c)(1),
(2) Date: Feb. 21, 2020

(87) PCT Pub. No.: WO2019/040644
PCT Pub. Date: Feb. 28, 2019

(65) Prior Publication Data
US 2020/0190342 A1 Jun. 18, 2020

Related U.S. Application Data

(60) Provisional application No. 62/548,677, filed on Aug. 22, 2017.

(51) Int. Cl.
*B05D 1/04* (2006.01)
*A61B 5/24* (2021.01)
(Continued)

(52) U.S. Cl.
CPC ............... *C09D 5/24* (2013.01); *A61B 5/24* (2021.01); *A61N 1/0551* (2013.01); *B05D 1/04* (2013.01);
(Continued)

(58) Field of Classification Search
CPC ... A61B 5/24; A61B 1/0551; A61B 2562/125; B05D 1/04; H01B 1/125; H01B 1/127; H01B 1/128
See application file for complete search history.

(56) References Cited

U.S. PATENT DOCUMENTS

| | | | |
|---|---|---|---|
| 2008/0071338 A1* | 3/2008 | Jiang | A61N 1/056 607/119 |
| 2016/0047720 A1* | 2/2016 | Wolgast | A61B 5/14546 506/7 |

OTHER PUBLICATIONS

Abidian et al. , Experimental and theoretical characterization of implantable neural microelectrodes modified with conducting polymer nanotubes, Biomaterials 29 (2008) 1273-1283. (Year: 2008).*

(Continued)

*Primary Examiner* — Hai Y Zhang
(74) *Attorney, Agent, or Firm* — pH IP Law

(57) ABSTRACT

In one aspect, the present disclosure provides nano and microstructures of conducting polymers which may be used in the treatment of neuron regeneration. In some embodiments, the microstructures may be a microcup or a nanogroove structure. The present disclosure also provides methods of preparing the conducting polymer coated microstructures and methods of using these compositions or structures.

18 Claims, 10 Drawing Sheets

(51) Int. Cl.
*A61N 1/05* (2006.01)
*C09D 5/24* (2006.01)
*C25B 3/29* (2021.01)
*H01B 1/12* (2006.01)

(52) U.S. Cl.
CPC ............... *C25B 3/29* (2021.01); *H01B 1/125* (2013.01); *H01B 1/127* (2013.01); *H01B 1/128* (2013.01); *A61B 2562/125* (2013.01)

(56) References Cited

OTHER PUBLICATIONS

Abidian et al. (NPL titled: Experimental and theoretical characterization of implantable neural microelectrodes modified with conducting polymer nanotubes, attached). (Year: 2008).*
Abidian et al., "Conducting-Polymer Nanotubes for Controlled Drug Release," *Adv. Mater.* 2006, 18, 405-409.
Abidian et al., "Experimental and theoretical characterization of implantable neural microelectrodes modified with conducting polymer nanotubes," *Biomaterials*, 29(9);1273-1283, 2009.
Abidian et al., "Multifunctional Nanobiomaterials for Neural Interfaces," *Adv. Funct. Mater.* 2009, 19, 573-585.
Antensteiner et al., "Conducting Polymer Microcups for Organic Bioelectronics and Drug Delivery Applications," *Advanced Materials*, 29(39):1702576, 2017.
Bajpai et al., "Conducting-Polymer Microcontainers: Controlled Syntheses and Potential Applications," *Adv. Funct. Mater.* 2004, 14, 145-151.
Berggren et al., "Organic Bioelectronics," *Adv. Mater.* 2007, 19, 3201-3213.
Bredas et al., "Polarons, bipolarons, and solitons in conducting polymers," *Accounts Chem. Res.* 1985, 18, 309-315.
Fattahi et al., "Microencapsulation of Chemotherapeutics into Monodisperse and Tunable Biodegradable Polymers via Electrified Liquid Jets: Control of Size, Shape, and Drug Release," *Adv. Mater.* 2013, 25, 4555-4560.
Green et al., "Conducting polymers for neural interfaces: challenges in developing an effective long-term implant," *Biomaterials* 2008, 29, 3393-3399.
Green et al., "Conductive hydrogels: mechanically robust hybrids for use as biomaterials," *Macromolecular Bioscience* 2012, 12, 494-501.
Groenendaal et al., "Poly(3,4-ethylenedioxythiophene) and Its Derivatives: Past, Present, and Future," *Adv. Mater.* 2000, 12, 481-494.
Guimard et al., "Conducting polymers in biomedical engineering," *Prog. Polym. Sci.* 2007, 32, 876-921.
Hardy et al., "Into the groove: instructive silk-polypyrrole films with topographical guidance cues direct DRG neurite outgrowth," *Journal of Biomaterials Science*, 26(17):1327-1342, 2015.
Heeger, "Semiconducting and Metallic Polymers: The Fourth Generation of Polymeric Materials (Nobel Lecture)," *Angew. Chem.-Int. Edit.* 2001, 40, 2591-2611.
Isaksson et al., "Electronic control of Ca2+ signalling in neuronal cells using an organic electronic ion pump," *Nat. Mater.* 2007, 6, 673-679.
Lee et al., "Polypyrrole-coated electrospun PLGA nanofibers for neural tissue applications," *Biomaterials* 2009, 30, 4325-4335.
Liu et al., "Polypyrrole coated PLGA core-shell nanoparticles for drug delivery and photothermal therapy," *Rsc Advances* 2016, 6, 84269-84275.
Luo et al., "Core-liquid-induced transition from coaxial electrospray to electrospinning of low-viscosity poly(lactide-co-glycolide) sheath solution," *Macromolecules*, 47:7930-7938, 2014.
Luo et al., "Sponge-like nanostructured conducting polymers for electrically controlled drug release," *Electrochem. Commun.* 2009, 11:1956.
MacDiarmid, ""Synthetic Metals": A Novel Role for Organic Polymers (Nobel Lecture)," *Angew. Chem.-Int. Edit.* 2001, 40, 2581-2590.
Malliaras et al., "Organic Bioelectronic Materials and Devices," *Adv. Mater.* 2015, 27, 7492.
PCT International Search Report and Written Opinion issued in International Application No. PCT/US2018/047565, mailed Oct. 22, 2018.
Qu et al., "Preparation of polypyrrole microstructures by direct electrochemical oxidation of pyrrole in an aqueous solution of camphorsulfonic acid," *J. Electroanal. Chem.* 2004, 561, 149-156.
Smela, "Conjugated Polymer Actuators for Biomedical Applications," *Adv. Mater.* 2003, 15, 481-494.
Takeuchi et al., "An Axisymmetric Flow-Focusing Microfluidic Device," *Adv. Mater.* 2005, 17, 1067.
Wallace et al., "Conducting polymers—bridging the bionic interface," *Soft Matter* 2007, 3, 665-671.
Yang et al., "High Performance Conducting Polymer Nanofiber Biosensors for Detection of Biomolecules," *Adv. Mater.* 2014, 26, 4954-4960.
Yang et al., "Microporous conducting polymers on neural microelectrode arrays: I Electrochemical deposition," *Sens. Actuator B-Chem.* 2004, 101, 133-142.

* cited by examiner

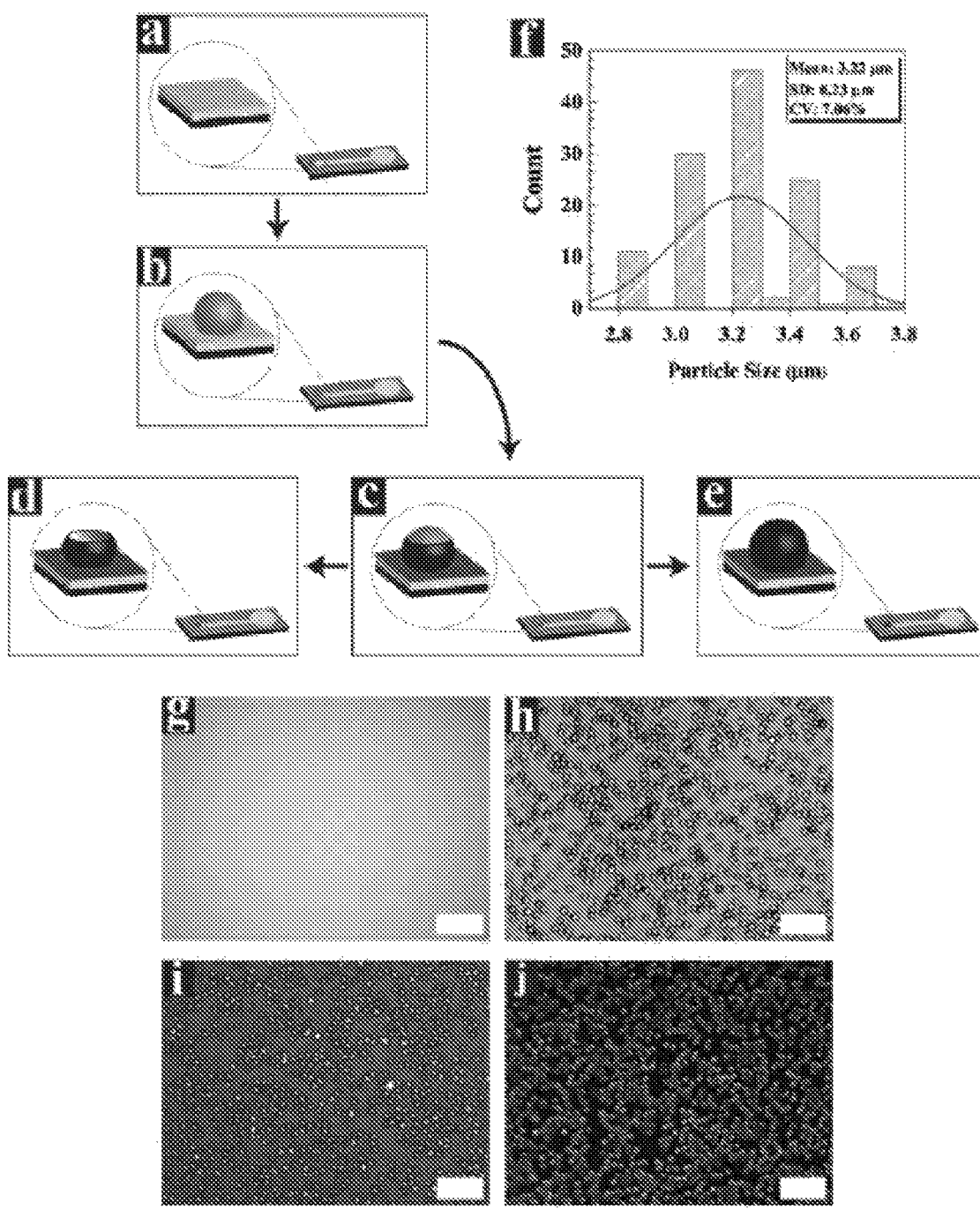
FIGS. 1A-J

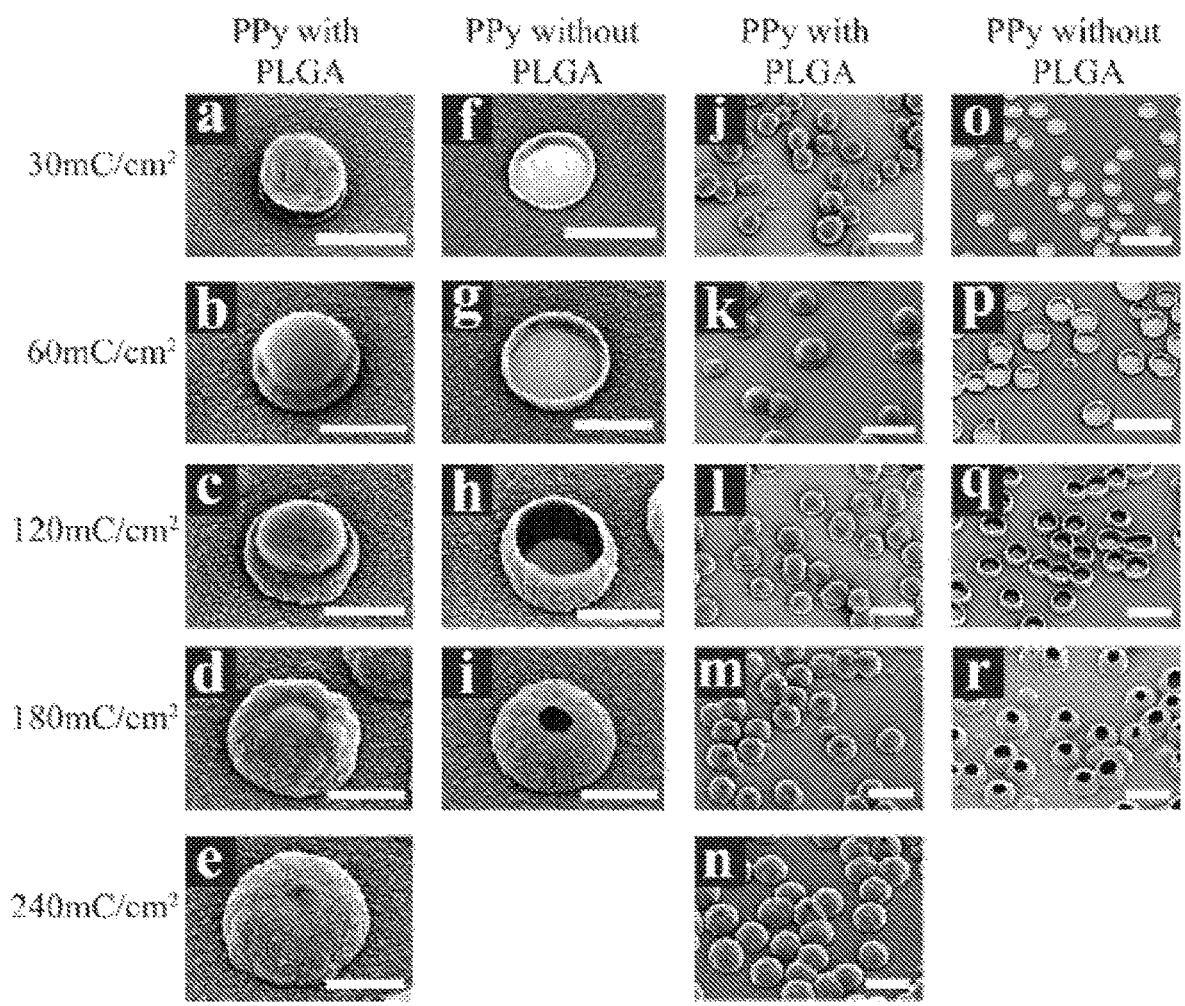
FIG. 2A-R

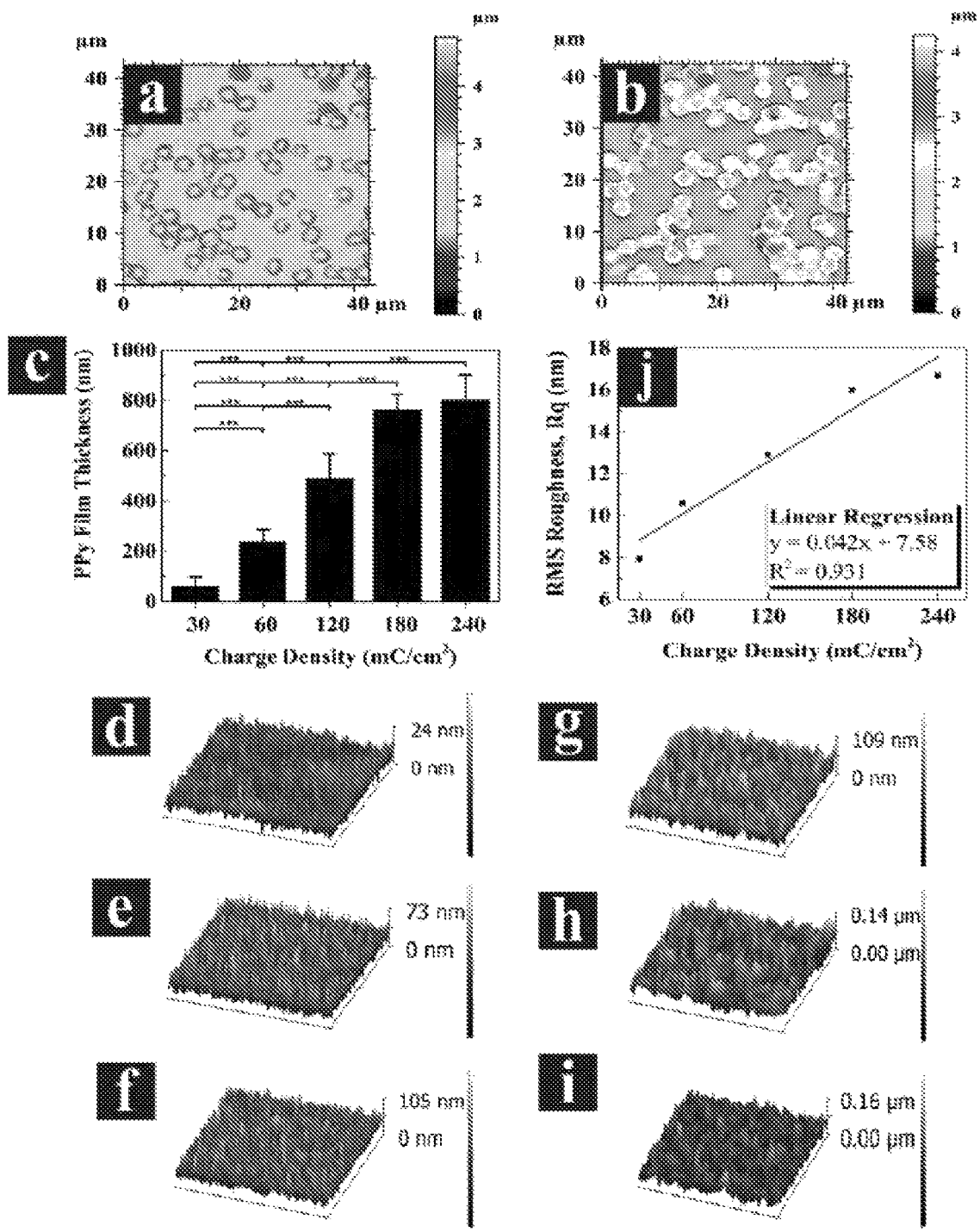
FIG. 3A-I

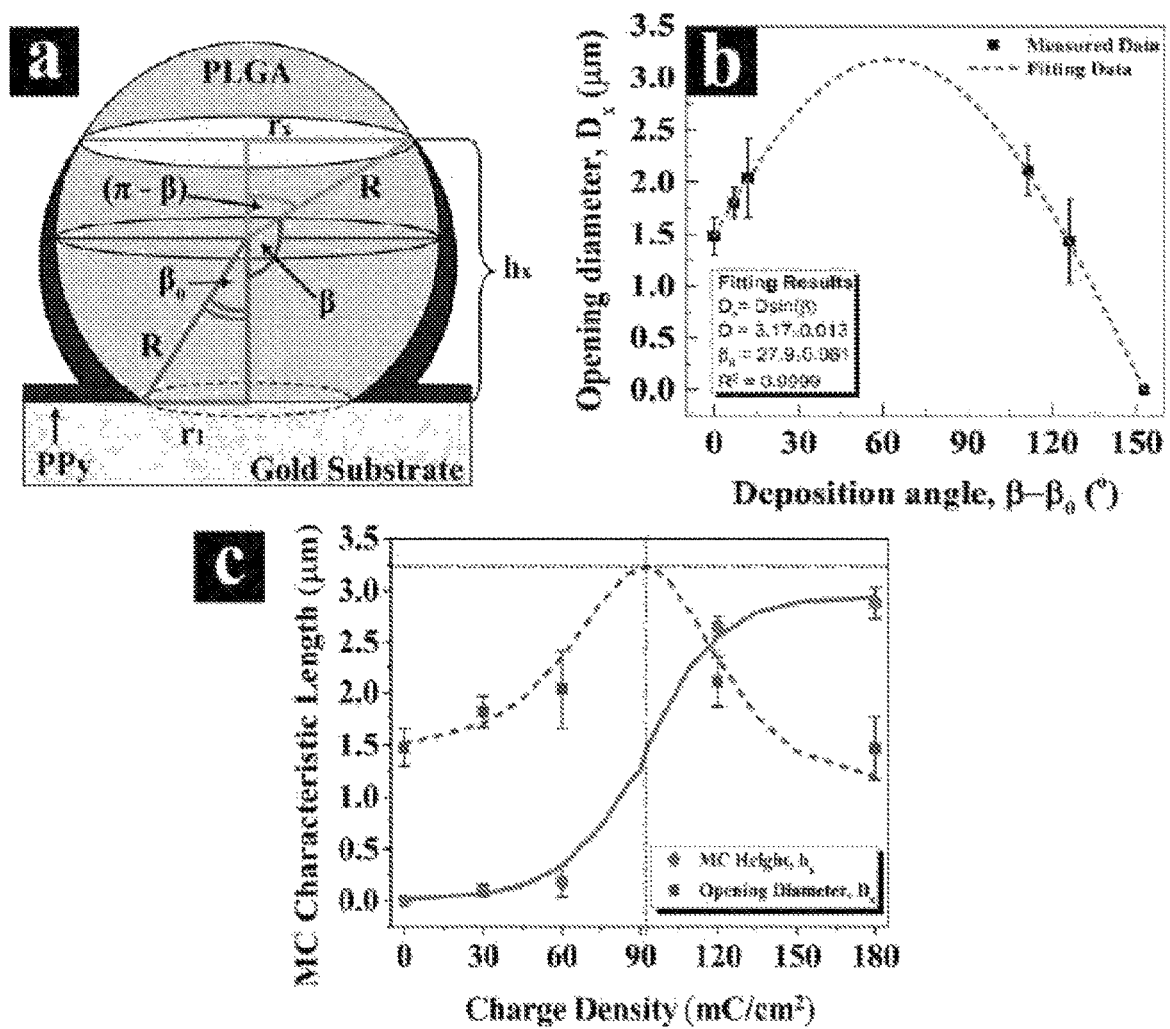
FIG. 4A-C

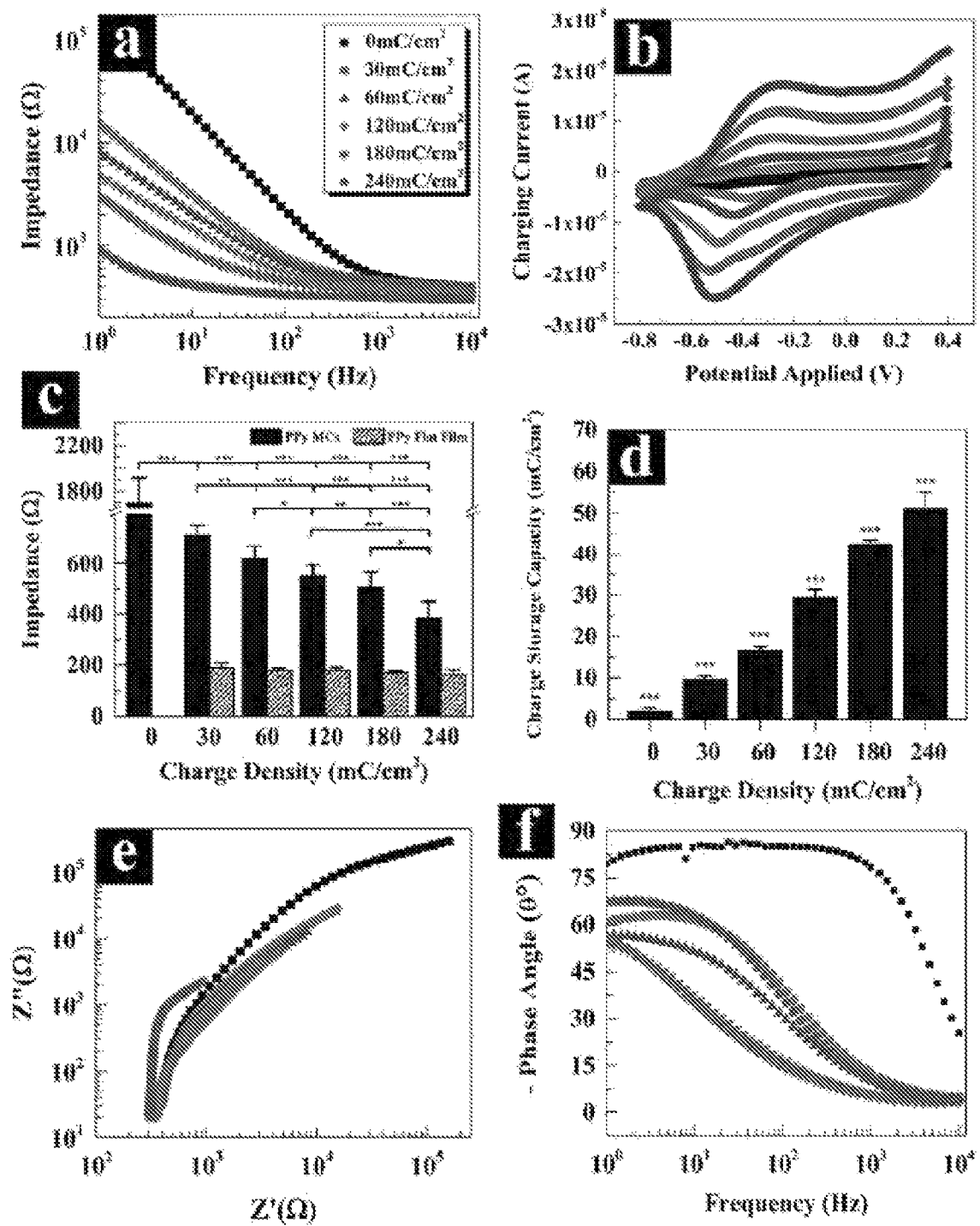
FIG. 5A-F

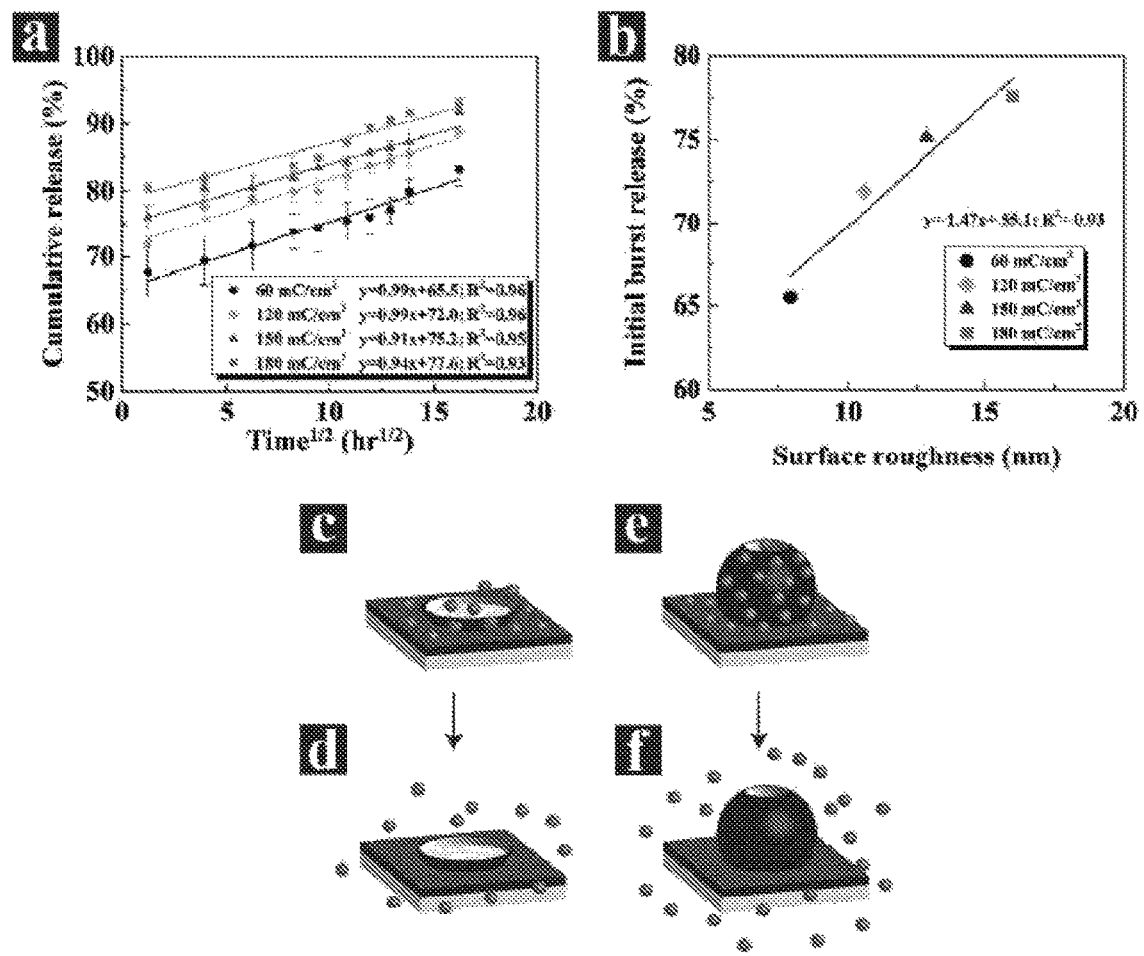
FIG. 6A-F
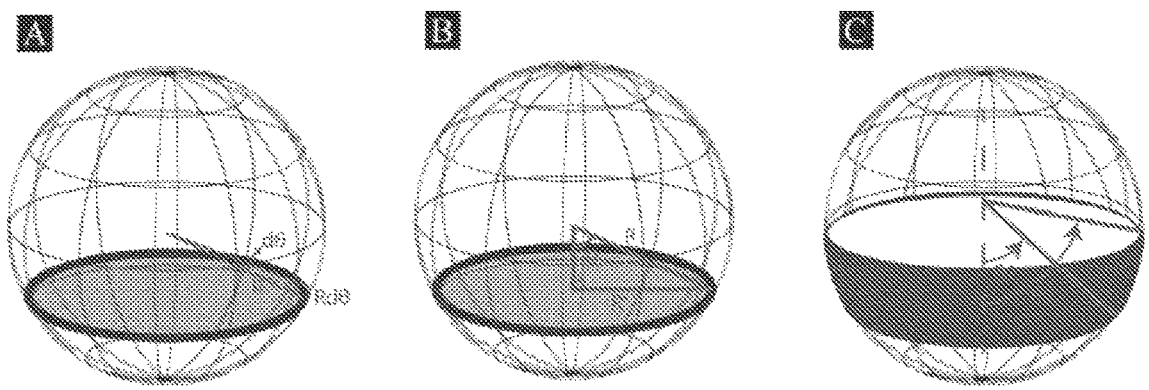
FIG. 7A-C

CONDUCTING POLYMER MICROCONTAINERS FOR ORGANIC BIOELECTRONICS AND DRUG DELIVERY

This application is a national phase application under 35 U.S.C. § 371 of International Application No. PCT/US2018/047565, filed Aug. 22, 2018, which claims the benefit of priority to U.S. Provisional Application No. 62/548,677 filed on Aug. 22, 2017, the entire contents of each of which are hereby incorporated by reference.

The development of this disclosure was funded in part by the National Institute of Health (NIH) under National Institute of Neurological Disorders and Stroke Grant No. NS087224.

BACKGROUND

1. Field

This disclosure relates to the fields of medicine, polymers, nanomaterials, chemistry, and neurological disorders. In particular, new structures, compositions, methods of treatment, and methods of synthesis relating to structures of conducting polymers are disclosed.

2. Related Art

The development of sensitive and selective biosensors and bioelectronics is of considerable interest for neural interface technologies, including electrochemical biosensors and neural stimulation/recording probes.[1-5] The primary requirement of neural devices is to provide high density electrodes [6-11] that are biologically compatible with neural tissue, efficiently transduce biological signals to electronic signals, and remain functional for long periods of time. The performance of neural interfaces ultimately relies on the physical, chemical, and electrical properties of the electrode materials, which enable long-lasting functional communications. Existing electrodes utilize metallic materials that are often not intrinsically compatible with neural tissue, and cause reactive tissue responses and electrode encapsulation [12-16]. In addition, metallic electrodes suffer from poor electrical performance, including low signal-to-noise ratio and low charge injection capacity, because of their planar micro-scale geometry. Several strategies have been reported to overcome these limitations and ultimately design a long-lasting functional interface. These strategies include optimizing the size, shape, and material of electrode substrates [12, 17-19], coating electrodes with bioactive molecules [20, 21], electrodepositing conductive materials [22-24], and delivering anti-inflammatory drugs [25-29].

Conducting polymers (CPs) such as poly(pyrrole) (PPy) have gained considerable attention in neural applications [30-32] owing to (1) their soft mechanical properties that simulate those of biological structures; (2) their mixed electronic/ionic conductivity that promotes efficient signal transduction; (3) their transparency that allows the simultaneous use of optical analysis techniques; and (4) their facile functionalization with biomolecules to tune biological responses [31, 33-35]. CPs have been employed to improve the electrical performance of neural recording and stimulation, release drugs and proteins at the electrode-tissue interface, and enhance axonal regeneration [24, 36-40]. Recent studies have produced a wide variety of CP micro and nanostructures, including nanoparticles [41], microcavities [42], microgrooves [43], hollow microbottles [44], microfibers [45], nanofibers [46] and microbowls [47]. Liu et al. chemically synthesized PPy PLGA nanoparticles to create PPy-PLGA core-shells [41]. Yang et al. produced CP microcavities using polystyrene latex spheres as templates [42]. Hardy and coworkers fabricated aligned CP microgrooves using a patterned silk fibroin on polydimethylsiloxane templates [43]. Schmidt and co-workers fabricated CP nanofiber structures by combining electrospun PLGA nanofibers with chemical deposition of PPy to create PPy meshes in order to promote neurite outgrowth.[46] Qu et al. developed a method to construct multiple PPy microcontainers, including hollow microcups, microtubules, and micro-bowls [44]. They applied cyclic voltammetry (CV) to form bubbles on the stainless steel electrodes, which acted as templates for hollow microbottles, microfibers, and microbowls. Bajpai et al. used a similar approach with β-naphthalenesulfonic acid stabilized $H_2$ gas bubbles to fabricate CP microcontainers [45]. The CP microstructures enhance the electrical performance (i.e., decrease the impedance and increase the charge storage capacity) of microelectrodes by increasing the effective surface area [47]. Furthermore, during electrochemical polymerization, biomolecules can be incorporated within the CP microstructures as dopants in order to enhance the cellular interactions [48, 49]. However, the incorporation of biomolecules may hinder the electrical properties of CPs, and the loading efficiency is limited by the doping level [50]. An additional challenge includes the creation of monodisperse CP microstructures with tunable surface morphology including size, shape, and roughness [2].

SUMMARY

In some aspects, the present disclosure provides structures of conducting polymer such as microcups or nanogroves which may be used as drug delivery devices in neurological systems. In some aspects, the present disclosure provides methods of preparing a conducting polymer coated microstructure comprising:

(A) obtaining a conductive surface and applying by electrospray a non-conductive polymer to obtain a non-conductive polymer coated surface; and (B) polymerizing a monomer to form a conductive polymer using conditions sufficient to cause an electrochemical polymerization onto the non-conductive polymer coated surface to obtain a conductive polymer coated surface;

provided the conducting polymer coated microstructure is not a cylinder.

In some embodiments, the conducting polymer coated microstructure is a cup or a groove. In some embodiments, the conductive surface is a metal electrode such as a gold electrode. In some embodiments, the non-conductive polymer is an electrosprayable polymer. In some embodiments, the non-conductive polymer is a polyester polymer such as a poly(lactide), poly(glycolide), or poly(lactide-co-glycolide). In some embodiments, the non-conductive polymer is poly(lactide-co-glycolide) including a monodisperse poly(lactide-co-glycolide). In other embodiments, the non-conductive polymer is a polyanhydride polymer such as a poly(serbacic acid) or polycaprolacton.

In some embodiments, the conductive polymer is a poly(pyrrole). In other embodiments, the conductive polymer is a poly(thiophene), poly(acetylene), polyphenylene sulfide, or poly(aniline) such as poly(p-phenylene sulfide) or poly (3,4-ethylenedioxythiophene). In some embodiments, the conductive polymer is polymerized around the non-conductive polymer.

In some embodiments, the present methods further comprise removing the non-conductive polymer from the conductive polymer coated surface to obtain a conducting polymer coated microstructure. In some embodiments, the non-conductive polymer is removed via dissolution in an organic solvent such as a C1-C6 haloalkane like chloroform. In some embodiments, the non-conductive polymer is applied as a composition containing the non-conductive polymer and an quaternary ammonium salt such as benzyltriethylammonium chloride.

In some embodiments, the non-conductive polymer is present at a concentration from about 1% w/w to about 25% w/w such as at 4% w/w. In some embodiments, the application of the non-conductive polymer comprises conditions sufficient to allow deposition of the non-conductive polymer. the conditions may comprise a temperature from about 10° C. to about 50° C. such as about room temperature. In some embodiments, the conditions comprise a humidity from about 5% to about 75% such as from about 25% to about 40%. In still some embodiments, the conditions comprise the use of a spinneret with a gauge from about 20 to about 30 such as a gauge of 22. In some embodiments, the conditions comprise an applied field from about 1 kV/m to about 1000 kV/m such as from about 50 kV/m to about 200 kV/m. In some embodiments, the conditions comprise a flow rate from about 100 µL/hr to about 1000 µL/hr.

In some embodiments, the conditions sufficient to cause an electrochemical polymerization comprise using a electrical source in the galvanostatic mode such as using a two electrode configuration. In some embodiments, the conditions comprise a temperature from about 10° C. to about 50° C. such as about room temperature. In some embodiments, the conditions comprise using a concentration of the monomer of the conductive polymer from about 0.05 M to about 2 M such as from about 0.1 M to about 0.5 M. In some embodiments, the conditions comprise polymerizing the monomer is a solution. In some embodiments, the solution further comprises a dopant such as a negatively charged molecule. The dopant may be a net negatively charged molecule such as a perchlorate, dodecylbenzenesulfonate, p-toluenesulfonate, laminine fragment, fibronectin fragment, or a negatively charged nerve growth factor. In other embodiments, the dopant is poly(styrenesulfonate).

In some embodiments, the conditions comprise applying a current density from about 0.01 mA/cm to about 5 mA/cm such as from about 0.1 mA/cm to about 1 mA/cm. In some embodiments, the conditions comprise a charge density from about 1 to about 500 mC/cm$^2$ such as from 10 to about 250 mC/cm$^2$ or from 25 to about 250 mC/cm$^2$. In some embodiments, the conducting polymer coated microstructure has a film thickness from about 25 nm to about 1000 nm such as about 50 nm to about 900 nm. In some embodiments, the conducting polymer coated microstructure has a opening diameter from about 0.5 µm to about 5 µm such as about 1.0 µm to about 2.5 µm. In other embodiments, the conducting polymer coated microstructure has no opening. In some embodiments, the conducting polymer coated microstructure has a surface roughness from about 2.5 nm to about 40 nm such as about 5 nm to about 20 nm. In some embodiments, the conducting polymer coated microstructure has a height from about 0.05 µm to about 5 µm such as about 0.1 µm to about 3.5 µm. In some embodiments, the conducting polymer coated microstructure has a surface area from about 0.1 mm$^2$ to about 25 mm$^2$ such as about 1 mm$^2$ to about 10 mm$^2$. In some embodiments, the conducting polymer coated microstructure has an impedance from about 200Ω to about 1000Ω such as about 400Ω to about 800Ω. In some embodiments, the conducting polymer coated microstructure has a charge storage capacity from about 0.5 mC/cm$^2$ to about 75 mC/cm$^2$ such as about 1 mC/cm$^2$ to about 50 mC/cm$^2$.

In another aspect, the present disclosure provides conducting polymer coated microstructures prepared as described above.

In still another aspect, the present disclosure provides methods of using a conducting polymer coated microstructure prepared as described above in a neural application. In some embodiments, the neural application is neural recording or stimulation. In some embodiments, the neural application is releasing a therapeutic agent to the neuron. In some embodiments, the therapeutic agent is a drug such as an anti-inflammatory drug or an anticancer agent. In other embodiments, the therapeutic agent is a protein such as a cell adhesive protein, a peptide, or a growth factor. In some embodiments, the neural application is axonal regeneration. In other embodiments, the neural application is neural recording. In other embodiments, the neural application is neural stimulation. In still other embodiments, the neural application is neurochemical detection. In another embodiment, the neural application is related to a neural interface.

In still another aspect, the present disclosure provides methods of using a conducting polymer coated microstructure prepared as described above in a biosensor.

In still yet another aspect, the present disclosure provides methods of using a conducting polymer coated microstructure prepared as described above in a bioelectronic.

It is contemplated that any method or composition described herein can be implemented with respect to any other method or composition described herein. For example, a compound synthesized by one method may be used in the preparation of a final compound according to a different method.

The use of the word "a" or "an" when used in conjunction with the term "comprising" in the claims and/or the specification may mean "one," but it is also consistent with the meaning of "one or more," "at least one," and "one or more than one." The word "about" means plus or minus 5% of the stated number.

Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE FIGURES

The following drawings form part of the present specification and are included to further demonstrate certain aspects of the present disclosure. The disclosure may be better understood by reference to one or more of these drawings in combination with the detailed description.

FIGS. 1A-J show a schematic illustration of the PPy MC fabrication process including bright and dark field optical micrographs. (FIGS. 1A and 1G) Au electrodes before surface modification. (FIGS. 1B and 1H) Electrosprayed PLGA microspheres on Au electrodes. (FIG. 1C) Partial PPy encapsulation of PLGA microspheres. (FIGS. 1D and 1I) PPy MCs formed by dissolving PLGA microspheres. (FIGS. 1E and 1J) Full PPy encapsulation of PLGA microspheres. (FIG. 1F) Histogram of PLGA diameter distribution. Scale bars=20 µm.

FIGS. 2A-R show scanning electron microscopy images of single (FIG. 2A-2E) and multiple (FIG. 2J-2N) PLGA microspheres partially coated with PPy at 30 mC/cm$^2$, 60 mC/cm$^2$, 120 mC/cm$^2$, and 180 mC/cm$^2$, and fully coated at 240 mC/cm$^2$ deposition charge density (deposition current density of 0.5 mA/cm$^2$ and deposition time of 1 min, 2 min, 4 min, 6 min, and 8 min, respectively). (FIG. 2F-2I) single and (FIG. 2O-2R) multiple hollow PPy MCs following PLGA degradation. Scale bars=2 μm for FIG. 2A-2I and 5 μm FIG. 2J-2R.

FIGS. 3A-3I show the thickness and roughness of PPy MCs. (FIG. 3A and FIG. 3B) Color height maps of PPy MCs electrodeposited at 180 mC/cm$^2$ to form partially coated microcups and at 240 mC/cm$^2$ to form fully coated microcups, respectively. (FIG. 3C) Bar graph of PPy film thickness as a function of applied charge density. The symbol *** indicates a significant difference of $p<0.001$. (FIG. 3D-3I) Atomic force micrographs comparing the root-mean-square (RMS) roughness (Rq) of the bare gold surface and PPy films produced at 30 mC/cm$^2$, 60 mC/cm$^2$, 120 mC/cm$^2$, 180 mC/cm$^2$ respectively. (FIG. 3J) RMS roughness as function of applied charge density showing the linear increase in Rq as deposition charge density increased. Data is shown with a ±SD (n=5).

FIGS. 4A-4C show a (FIG. 4A) schematic demonstrating the growth of PPy on PLGA microspheres at different deposition charge densities, which were used to calculate the MC characteristic lengths. Briefly, the area of both the Au circles and at the top opening of the PPy MCs were used to determine the opening diameter (Dx), coating height (hx), the spherical cap angle β$_0$, and MC angle β. (FIG. 4B) Plot showing fitted data of opening diameter mapped onto the MC angle using Equation 3. (FIG. 4C) Plot showing the variation of opening diameter (blue squares) and MC height (red circles) with deposition charge density. To predict the dependence of the MC characteristic lengths on deposition charge density, each data set was fitted with a generalized logistic function in conjunction with Equation 1 and 2. For example, the maximum opening diameter (3.23 μm) can be achieved at 92 mC/cm$^2$ (dashed crosshair). Data is shown with a ±SD (n=50).

FIGS. 5A-5F show electrical properties of Au electrodes modified with PPy MCs: bare gold (0 mC/cm$^2$, squares), 30 mC/cm$^2$ (circles), 60 mC/cm$^2$ (triangles), 120 mC/cm$^2$ (upside-down triangles), 180 mC/cm$^2$ (diamonds), 240 mC/cm$^2$ (pentagon). (FIG. 5A) Impedance spectrum over a frequency range of 1-104. (FIG. 5B) Cyclic voltammetry, the potential swept from −0.8 V to 0.4 V with a scan rate 30 mV/s. (FIG. 5C) Impedance at 110 Hz as a function of deposition charge density. (FIG. 5D) Charge storage capacity as a function of deposition charge density. (FIG. 5E) Nyquist plot of impedance spectrum. (FIG. 5F) Phase angle of impedance spectrum. Data is shown with a ±SD (n=6). The symbols *, , and * demonstrate a significant deference $p<0.001$, $p<0.01$, and $p<0.05$ between the groups, respectively.

FIGS. 6A-6F show in vitro release study of DEX from PPy MCs: (FIG. 6A) plot showing the in vitro release profile of DEX from PPy MCs as a function of deposition charge density 60 mC/cm$^2$ (squares), 120 mC/cm$^2$ (diamonds), 150 mC/cm$^2$ (triangles), and 180 mC/cm$^2$ (squares), data is shown with a ±SD (n=5), (FIG. 6B) plot showing the correlation of initial burst release with surface roughness. Data points are charge density of 60 mC/cm$^2$ (circle), 120 mC/cm$^2$ (diamonds), 150 mC/cm$^2$ (triangles) and 180 mC/cm$^2$ (squares), (FIG. 6C-6F) schematic of DEX loading and release from PPy film/MCs with different MC heights and opening diameters.

FIGS. 7A-7C show (FIG. 7A) a schematic of a sphere indicating the partial element of a PPy wall and (FIGS. 7B and 7C) the position of R, R', θ1, and θ2.

(FIG. 8B) aligned PLLA fibers, (FIG. 8C) partially coating of PLLA fibers using CP, (FIG. 8D) dissolving PLLA nanofibers to form CP nanogrooves (FIG. 8E) fully coating of PLLA fibers followed by dissolving PLLA nanofibers to form CP nanotubes.

(FIG. 9D) Fully coated PLLA fibers by PPY CPs in 4 min electropolymerization (FIGS. 9G-9H) fully coated PLLA fibers by PEDOT in 3 and 4 min electropolymerization. All the pictures are tilted for 45° in magnification of 25 kx. The scale bar is 2 μm.

DESCRIPTION OF ILLUSTRATIVE EMBODIMENTS

Figures 8A, 8B, 8C, 8D, 8E:
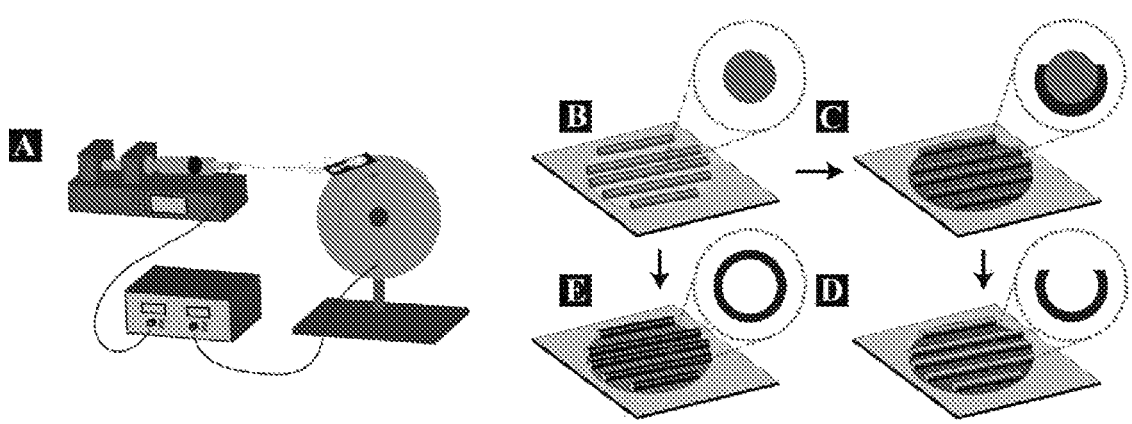
FIGS. 8A-8E show schematic illustration of (FIG. 8A) electrospinning setup including syringe pump, power supply, rotating wheel and substrate. Fabrication process of aligned CPNs on Au-coated substrate.

The present disclosure provides structures of conducting polymers such as microcups which may be used in multiple applications such as bioenergetics application as well as therapeutic applications in neurons. In some aspects, these compositions and/or structures are prepared such that the compositions may exhibit improved properties, chemical stability, or both. Also, provided herein are methods of using and methods of preparing these compositions or structures.

I. NON-CONDUCTIVE AND CONDUCTIVE POLYMERS

The "non-conductive polymer" does not conduct electricity or conducts electricity significantly less efficiently than conductive polymers. Without being bound by theory, non-conductive polymers lack a conjugated π-system and thus electrons are not able to be delocalized over an extended number of atoms. Non-limiting examples of non-conductive polymers include polyester polymers, such as poly(lactide), poly(glycolide), poly(lactide-co-glycolide), and polyanhydride polymers such as poly(serbacic acid) or polycaprolactone, or substituted versions thereof. The non-conductive polymer may be applied as a composition containing the non-conductive polymer and a quaternary ammonium salt. Non-limiting examples of suitable quaternary ammonium salts include benzyltriethylammonium chloride, tetraethylammonium chloride, tetraethylammonium bromide, tetrabutylammonium hydroxide, and tetrabutylammonium fluoride. When the non-conductive polymer is in a composition, the composition comprises the non-conductive polymer from about 1% w/w to about 25% w/w. In some embodiments, the composition comprises the non-conductive polymer from about 1% w/w, 2% w/w, 3% w/w, 4% w/w, 5% w/w, 6% w/w, 7% w/w, 8% w/w, 9% w/w, 10% w/w, 12% w/w, 14% w/w, 16% w/w, 18% w/w, 20% w/w, to about 25% w/w.

The "conductive polymer" used in the present methods refers to an organic polymer that conducts electricity. Without being bound by theory, conductive polymers comprise an extended π-system in which adjacent π-orbitals overlap allowing for the delocalization of electrons across the entirety of the π-system. The π-system may comprise alternating double and/or triple bonds, heteroatoms, or a combination thereof. Non-limiting examples of conductive polymers include poly(pyrrole), poly(thiophene), poly(acetylene), polyphenylene, polyphenylene sulfide, poly(aniline), and substituted versions thereof, such as poly(3,4-ethylenedioxythiophene) (PEDOT).

II. DEPOSITION AND ELECTROCHEMICAL POLYMERIZATION CONDITIONS

Conditions that can be modulated in order to promote, enhance, or accelerate deposition of a non-conductive polymer applied by electrospray include, but are not limited to, temperature, humidity, spinneret gauge, applied field, and flow rate. When a non-conductive polymer or a composition thereof is applied to a conductive surface, the temperature is between about 10° C. to about 50° C. In some embodiments, the temperature is from about 10° C., 15° C., 16° C., 17° C., 18° C., 19° C., 20° C., 21° C., 22° C., 23° C., 24° C., 25° C., 26° C., 27° C., 28° C., 29° C., 30° C., 35° C., 40° C., 45° C., to about 50° C. The humidity is from about 5% to 75%, such as from about 25% to about 40%. In some embodiments, the humidity is from about 5%, 10%, 15%, 20%, 25%, 30%, 35%, 40%, 45%, 50%, 55%, 60%, 65%, 70%, to about 75%. The non-conductive polymer or composition thereof is applied to the conducive surface via a spinneret. The spinneret has a gauge of from about 20 to about 30. In some embodiments, the gauge of the spinneret is 20, 21, 22, 23, 24, 25, 26, 27, 28, 29, or 30. When the non-conductive polymer or a composition thereof is applied to a conductive surface, an electric field may be applied. When such a field is applied, the applied field is from about 0.5 kV/m to about 1000 kV/m, such as from about 50 kV/m to about 200 kV/m, or such as from about 0.5 kV/m to about 10 kV/m. In some embodiments, the applied field is from about 0.5 kV/m, 1 kV/m, 2 kV/m, 3 kV/m, 4 kV/m, 5 kV/m, 6 kV/m, 7 kV/m, 8 kV/m, 9 kV/m, 10 kV/m, 25 kV/m, 50 kV/m, 75 kV/m, 100 kV/m, 125 kV/m, 150 kV/m, 175 kV/m, to about 200 kV/m. When a non-conductive polymer or composition thereof applied to a conductive surface, it is applied with a flow rate from about 100 µL/hr to about 1000 µL/hr. In some embodiments, the flow rate is from about 100 µL/hr, 200 µL/hr, 300 µL/hr, 400 µL/hr, 500 µL/hr, 600 µL/hr, 700 µL/hr, 800 µL/hr, 900 µL/hr, to about 1000 µL/hr.

Conditions that can be modulated in order to promote, enhance, or accelerate electrochemical polymerization include, but are not limited to, monomer concentration, temperature, use and concentration of dopants, configuration and mode of use of an electrical source, and current density applied. When an electrical source is used in the electrochemical polymerization of a monomer to obtain a conductive polymer, the electrical source is used in the galvanostatic mode and the electrical source may used in various configurations. In some embodiments, a two-electrode configuration is used, while in other embodiments, a four-electrode configuration is used. Polymerization of the monomer is achieved at a temperature from about 10° C. to about 50° C. In some embodiments, the temperature is from about 10° C., 15° C., 16° C., 17° C., 18° C., 19° C., 20° C., 21° C., 22° C., 23° C., 24° C., 25° C., 26° C., 27° C., 28° C., 29° C., 30° C., 35° C., 40° C., 45° C., to about 50° C. The concentration of the monomer of the conductive polymer from about 0.05 M to about 2 M. In some embodiments, the concentration of the monomer of the conductive polymer is from about 0.05 M, 0.1 M, 0.2 M, 0.3 M, 0.4 M, 0.5 M, 0.6 M, 0.7 M, 0.8 M, 0.9 M, 1 M, 1.5 M, to about 2 M. The monomer may be polymerized while in solution and the solution may further comprise a dopant. Suitable dopants are negatively charged and non-limiting examples of dopants include perchlorate, dodecylbenzenesulfonate, p-toluenesulfonate, laminine fragment, fibronectin fragment, a negatively charged nerve growth factor, or poly(styrenesulfonate). Polymerization of the monomer may further comprise applying a current density from about 0.01 mA/cm$^2$ to about 5 mA/cm$^2$, such as from about 0.01 mA/cm$^2$ to about 5 mA/cm$^2$. Polymerization of the monomer may further comprise applying a charge density from about 1 mC/cm$^2$ to about 500 mC/cm$^2$, such as from about 10 mC/cm$^2$ to about 250 mC/cm$^2$, or such as from about 25 mC/cm$^2$ to about 250 mC/cm$^2$.

III. BIOSENSORS AND BIOELECTRONICS

The long-term performance of biosensors and bioelectronics relies on biocompatibility and sensitivity of the electrode-tissue interface. Microstructures prepared according to the methods disclosed herein may be used to in biosensing and/or bioelectronic applications and may enhance biocompatibility, biostability, efficacy, signal to noise ratio, charge-transfer capacity, or abrogate undesirable immune response. Non-limiting examples of biosensors and bioelectronics include neural electrodes. Current neural electrodes are limited by poor electrical performance including high initial impedance and low charge storage capacity. In addition, they are mechanically hard which causes cellular reactive response to the implanted electrode. Neural electrodes comprising conducting polymer microstructures prepared according to the methods disclosed herein offer an alternative and may exhibit higher levels of biocompatibility.

In some embodiments of the present disclosure, devices such as electrodes comprising conducting polymer coated microstructures disclosed herein can be used to provide for electrical stimulating and sensing that can facilitate drug and bioactive substance delivery in a controlled and specific manner There are numerous configurations of electrode substrate coated with microcups and/or nanogrooves having drug delivery and nanofiltration capabilities presently contemplated by the present disclosure which can be successfully practiced. In various embodiments, the present disclosure can be adapted to create fully integrated and more efficacious implanted electrodes for cortical recording/stimulation, deep brain stimulators, peripheral nerve electrodes, cardiac anti-arrythmia devices, muscle stimulation, surgical ablation (epilepsy treatments), pH monitoring, glucose sensing, cochlear implants, and retinal prosthetics.

Devices comprising conducting polymer coated microstructures described herein can be connected to power supplies which can include a battery, a direct wire to a DC or AC power source, and can further include one or more switches or variable resistors to control the electrical signal inputted to the conducting monomers for electrochemical polymerization and/or for stimulating the microcups or nanogrooves to release stored bioactive substances to adjacent or localized target cells or tissues. In various embodiments, the power source can be connected to a counter electrode and/or reference electrode. In some embodiments, while in use, the electrodes can be in contact with a physiological medium such as spinal fluid, blood, neurons, brain, heart and muscle tissue. The devices can also be connected to sophisticated current delivery devices and computers/CPUs, including pulse generators, radio frequency modulators, counters and recorders for electrical output and recording functions. Furthermore, in addition to the advanced biomimetic features of the electrode substrate coated at least with a portion of nanotubes and nanoparticles, the ability to deliver bioactive substances in response to electrical stimulation provides a novel and improved modality in disease treatment and tissue regeneration. Moreover, drug loaded conducting polymer nanotubes and nanoparticles are highly biocompatible, having low electrical impedance, cell-attracting, high surface area, electrically active coating for electrode-based biomedical devices.

The present disclosure provides conducting microcup or nanogroove structures for precisely controlled release of one or more drug for electrically sensing and stimulating biomedical device applications. Targeted delivery by the electrically conducting microcups and nanogrooves can be performed precisely by releasing individual drugs and bioactive substances at desired points in time using electrical stimulation of conducting polymers. In accordance with the present disclosure, the methods described herein provide a generally useful means for creating low impedance, biologically active polymer coatings which can facilitate integration of electronically active devices with living tissues. Other biomedical applications of the devices contemplated by the present disclosure include: molecule-eluting, electrically active polymer microcups and nanogrooves facilitating highly localized stimulation of neurite outgrowth and guidance for neural tissue regeneration using neuronal growth and differentiation factors.

In some embodiments, the present disclosure provides for sensing devices having spatially and temporally controlled drug delivery for ablation and pharmacological alteration of specific cell populations. The drug and bioactive substance loaded nanotubes and nanoparticles of the present disclosure can also be used for functionalizing microelectrodes on neural prostheses and biosensors. However, the electrically conducting drug delivery devices comprising an electrode substrate, having a network of electrically conductive nanotubes comprising biocompatible non-degradable polymers or nanoparticles loaded with bioactive substances previously coated with conducting, biocompatible, non-degradable polymers can also be expected to be applied in a broad range of fields such as organic chemistry, biomedical engineering, and pharmacology. The improved design represents a new generation of biomaterials that can interact with living tissue including cells within and adjacent to biomedical device implantation sites via signaling mechanisms that have until recently, been the exclusive domain of cells themselves. Practical application of biological sensors comprising conducting polymer microcups or nanogrooves as disclosed herein can include glucose detection.

In certain embodiments of the present disclosure, the conducting polymer microcups or nanogrooves can be directly deposited within living tissue thereby reducing the likelihood of electrode damage and tissue damage during and after electrode implantation. In certain embodiments, the resulting cell-based conducting electrode can be in intimate contact with the plasma membrane of living cells. In certain embodiments, the growth of the 3-dimensional microcup or nanogroove network from the surface of the implanted bioactive substance drug delivery device comprising electrospun nanofibers loaded with bioactive substances can create an electrically-connected diffuse network of molecularly thin polymer microcups or nanogrooves, such as microcups or nanogrooves partially encapsulating cells, effectively innervating the tissue.

IV. DEFINITIONS

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

Throughout this application, the term "around" when used in conjunction with the location of the polymerization means that the polymer is deposited on at least one side of the target object. In a preferred embodiment, the polymer is deposited on at least three sides.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result. "Effective amount," "Therapeutically effective amount" or "pharmaceutically effective amount" when used in the context of treating a patient or subject with a compound means that amount of the compound which, when administered to a subject or patient for treating or preventing a disease, is an amount sufficient to affect such treatment or prevention of the disease.

As used herein, the term "patient" or "subject" refers to a living mammalian organism, such as a human, monkey, cow, sheep, goat, dog, cat, mouse, rat, guinea pig, or transgenic species thereof. In certain embodiments, the patient or subject is a primate. Non-limiting examples of human patients are adults, juveniles, infants and fetuses.

"Treatment" or "treating" includes (1) inhibiting a disease in a subject or patient experiencing or displaying the pathology or symptomatology of the disease (e.g., arresting further development of the pathology and/or symptomatology), (2) ameliorating a disease in a subject or patient that is experiencing or displaying the pathology or symptomatology of the disease (e.g., reversing the pathology and/or symptomatology), and/or (3) effecting any measurable decrease in a disease in a subject or patient that is experiencing or displaying the pathology or symptomatology of the disease.

The above definitions supersede any conflicting definition in any reference that is incorporated by reference herein. The fact that certain terms are defined, however, should not be considered as indicative that any term that is undefined is indefinite. Rather, all terms used are believed to describe the disclosure in terms such that one of ordinary skill can appreciate the scope and practice the present disclosure.

V. EXAMPLES

The following examples are included to demonstrate preferred embodiments of the disclosure. It should be appreciated by those of skill in the art that the techniques disclosed in the examples which follow represent techniques discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1—General Design and Synthesis of Conducting Polymer Microcups

To overcome these challenges, herein is reported a new templating method for the fabrication of monodisperse conducting polymer microcups (MCs) with tunable surface morphology and electrical properties, controlled drug loading, and sustained drug release. The fabrication of CP MCs involves (1) electrospraying of monodisperse poly(lactide-co-glycolide) (PLGA) microspheres on gold (Au) substrates, (2) electrochemical polymerization of PPy around PLGA microspheres, and (3) dissolution of the PLGA microspheres. The surface morphology precisely controlled by adjusting current density and electrodeposition time. FIG. 1 shows a schematic of the fabrication process and optical images of PLGA microspheres and PPy MCs. PLGA microspheres were first electrosprayed on Au electrodes. PPy electrochemical polymerization was then initiated on the Au electrode, and subsequently advanced around the PLGA microspheres to form partially or fully coated PLGA microspheres (FIGS. 1C and 1E) [50-52]. Finally, the PLGA microspheres were removed via dissolution from partially-coated samples to form PPy MCs (FIG. 1D). The effect of the electrospraying process parameters on the morphology and size of deposited PLGA particles was examined in an earlier study 1531 As shown in FIG. 1F, the mean diameter of the electrosprayed PLGA microspheres in this study was 3.22±0.23 µm with a coefficient of variance (CoV) of 7%, indicating a roughly monodisperse size distribution [54, 55].

The morphology of PPy MCs was characterized using scanning electron microscopy (SEM). FIGS. 2A-2E and 2J-2N show progressive growth of PPy around PLGA microspheres for different deposition charge densities. As shown in these figures, the PLGA microspheres were partially coated with PPy for deposition charge densities of 30-180 mC/cm² (FIGS. 2A-2D and 2J-2M), and fully coated at deposition charge density 240 mC/cm² (FIGS. 2E and 2N). Due to the CoV of microsphere size, a few fully coated microspheres were observed at deposition charge density 180 mC/cm². After dissolution of PLGA from the partially-coated microspheres, the produced PPy MCs did not collapse (FIGS. 2F-2I and 2O-2R), presumably due to the mechanical strength of PPy microstructures [40].

Materials confocal microscopy was utilized to map the surface topology and thickness of PPy films. FIGS. 3A and 3B are color maps of surface elevation for electrode surfaces modified by PPy MCs that were produced with charge densities of 180 mC/cm² (partially coated PPy) and 240 mC/cm² (fully coated PPy), respectively. The measured PPy film thicknesses were 62±35 nm, 240±48 nm, 488±99 nm, 791±63 nm, and 802±101 nm for 240 mC/cm², respectively. All thickness changes were significant (p<0.001) as the deposition current density increased except for increasing from 180 mC/cm² to 240 mC/cm² (FIG. 3C). The surface roughness (Rq) of PPy was characterized using atomic force microscopy, as shown in FIG. 3D-3I. The surface roughness increased linearly with deposition charge density, with measured values of 2.38 nm (bare gold) to 7.93 nm, 10.6 nm, 12.9 nm, 16.0 nm, and 16.7 nm for deposition charge densities of 30 mC/cm², 60 mC/cm², 120 mC/cm², 180 mC/cm², and 240 mC/cm², respectively (FIG. 3J).

As shown in FIGS. 2F-2H, the circular footprint of the PPy MCs (uncoated Au) suggests that the PLGA microspheres were flattened at the bottom upon landing on the Au substrate. The circular Au footprint area and the cup opening diameter (Dx) of the PPy MCs were measured to determine their basal diameter (Db=1.48±0.18 µm) and height above the Au substrate (hx). The opening diameters were 1.48±0.18 µm, 1.82±0.15 µm, 2.04±0.38 µm, 2.11±0.24 µm, and 1.43±0.3 µm for deposition charge densities of 0 mC/cm², 30 mC/cm², 60 mC/cm², 120 mC/cm², and 180 mC/cm², respectively. The opening diameter was 0 µm for a deposition charge density of 240 mC/cm² because the PLGA microspheres were completely encapsulated by PPy in that case. Assuming a spherical cap shape for the PPy MCs, the MC height was calculated from Equation 1.

$$h_x = \frac{1}{2}D(\cos\beta_0 - \cos\beta)$$

Equation 1. D is the mean diameter of PLGA microspheres and the spherical cap angle $\beta_0$ and MC angle $\beta$ (defined in FIG. 4A) are related to $D_b$ and $D_x$ measurements according to Equation 2 and Equation 3.

$$\beta_0 = \sin^{-1}\left(\frac{D_b}{D}\right). \quad \text{Equation 2}$$

$$D_x = D\sin\beta. \quad \text{Equation 3}$$

The calculated MC heights were 0.10±0.06 µm, 0.18±0.15 µm, 2.65±0.10 µm, 2.88±0.15 µm, and 3.05±0.0 µm for deposition charge densities of 30 mC/cm², 60 mC/cm², 120 mC/cm², 180 mC/cm², and 240 mC/cm², respectively (FIG. 4C). There was a statistically significant difference (p<0.001) among all MC heights.

Based on a spherical cap shape for the PPy MCs, the measured opening diameter of each PPy MC was associated with a MC angle (β) using Equation 3 represented by the dashed line in FIG. 4B. The deposition charge density (ρ) corresponding to each opening diameter measurement was thus associated with the MC angle for that measurement. In order to provide insight into the variation of opening diameter with deposition charge density, the deposition charge density associated with each data point was mapped onto the MC angle (β) using a logistic function, Equation 4.

$$\frac{\beta - \beta_0}{180 - \beta_0} = a[1 + e^{-(\rho-\rho_0)/b}]^{-n}$$

Equation 4. β is in degrees, ρ is in mC/cm², and $\beta_0$ is the angle characterizing the diameter of the circular Au footprint of the PPy MC, as defined by Equation 2.

The resulting mapping was used in conjunction with Equation 3 to establish the dependence of the opening diameter on deposition charge density, as shown by the dashed line in FIG. 4C. The dashed line in this figure corresponds to values of a=n=0.87, b=18, and $\rho_0$=97 in Equation 4. As shown in FIGS. 4B and 4C, the mean opening diameter increased from 1.48±0.18 μm to 2.04±0.38 μm as the deposition charge density increased from 0 to 60 mC/cm$^2$ and PPy growth on the PLGA microsphere advanced on the lower hemisphere ((β<) 90°. In contrast, the mean opening diameter decreased from 2.11±0.11 μm, and 1.47±0.3 μm as the deposition charge density was increased from 120 mC/cm$^2$ to 180 mC/cm$^2$, due to PPy growth advancing on the upper hemisphere (β>90°) for this range of deposition charge densities. According to the dashed line in FIG. 4C, the maximum opening diameter was 3.23 μm, which was achieved at a deposition charge density of 92 mC/cm$^2$. For deposition charge densities less than 180 mC/cm$^2$, the opening diameters were symmetrically distributed around the maximum opening diameter. For example, the opening diameters for deposition charge densities of 60 mC/cm$^2$ and 120 mC/cm$^2$ were the same because they were characterized by MC angles symmetric about the equator of PLGA microspheres (i.e., with the same values of |β−90|) as PPy growth crossed the equator. All opening diameters smaller (or larger) than the maximum diameter were statistically different (p<0.001).

The dependence of the height of PPy MCs ($h_x$) on deposition charge density is shown by the solid line in FIG. 4C. The predicted dependence was calculated by using Equation 4 for the relation between deposition charge density and MC angle β in conjunction with Equations 1 and 2. The MC height was a monotonically increasing function of deposition charge density, increasing dramatically between 60 and 120 mC/cm$^2$ as the PPy coating advanced across the equator of the PLGA microsphere during this time. The MC height eventually reached a maximum of 3.05 μm, as reflected by its value for deposition charge density of 240 mC/cm$^2$ when the PLGA microspheres were completely encapsulated by PPy. The maximum MC height was slightly smaller than the mean diameter of PLGA microspheres (3.23±0.23 μm) because the microspheres were flattened at the bottom upon landing on the Au substrate. The surface area of PPy MCs was calculated according to Equation 8 and Equation 9 (see Example 2). The surface area of the PPy MCs was 0.23±0.09 mm$^2$, 0.45±0.18 mm$^2$, 6.1±0.24 mm$^2$, and 6.62±0.24 mm$^2$ for deposition charge density 30 mC/cm$^2$, 60 mC/cm$^2$, 120 mC/cm$^2$, and 180 mC/cm$^2$, respectively. There was a statistically significant difference (p<0.001) among all surface area of PPy MCs.

Electrochemical impedance spectroscopy was used to investigate the electrical conductivity as the conducting polymer formed at different deposition charge densities. The formations of both PPy film and PPy MCs (i.e., PPy film/MCs) on Au electrodes contribute to their measured impedance. As shown in FIG. 5A, the impedance of Au electrodes was significantly reduced by the addition of PPy film/MCs. To examine the effect of PPy MCs on the impedance, PPy films were electrodeposited on gold electrodes (without PPy MCs) and the measured impedances of the PPy film electrodes were compared with those of their PPy film/MCs counterparts. As shown in FIG. 5C for a frequency of 110 Hz, the PPy film electrodes (controls) had lower impedances than their PPy film/MCs counterparts. That is because PPy film completely covered the surface of Au electrodes in the control experiments, whereas in the case of PLGA templates, uncoated gold remained exposed at the footprints of the MCs in the PPy film/MCs electrodes. There was no significant change in the impedance of the PPy film (control) electrode with increasing deposition current density, whereas the impedance of the PPy film/MCs electrode was significantly reduced (p<0.001) from 714±42Ω to 624±47Ω, 551±43Ω, and 506±59Ω as the deposition charge density increased from 30 mC/cm$^2$ to 60 mC/cm$^2$, 120 mC/cm$^2$, and 180 mC/cm$^2$, respectively. This can be explained by the significant increase in the PPy film/MCs surface area from 1.82±0.09 mm$^2$ to 2.04±0.18 mm$^2$, 7.69±0.24 mm$^2$, and 8.21±0.24 mm$^2$, respectively, arising from the growth of MCs as the deposition charge density increased from 30 mC/cm$^2$ to 60 mC/cm$^2$, 120 mC/cm$^2$, and 180 mC/cm$^2$. The minimum impedance of 384±66Ω was achieved for a deposition charge density of 240 mC/cm$^2$, showing that the completely closed PPy MCs resulted in a ~77% reduction in impedance compared to impedance of bare gold electrode (1696±223Ω, FIG. 5C).

The Nyquist and phase angle plots in FIGS. 5E and 5F demonstrate the resistance and capacitance properties of electrodes. PPy film/MCs electrodes demonstrated a monotonic decrease in capacitive property with increasing frequency, with the highest reduction rate in capacitance occurring at lower frequencies as the deposition charge density increased from closed PPy MCs might be the reason for the different behavior observed for deposition charge density increased from 30 mC/cm$^2$ to 180 mC/cm$^2$ (FIGS. 5E and 5F). The existence of PLGA microspheres inside of closed PPy MCs might be the reason for the different behavior observed for depostition charge density of 240 mC/cm$^2$. Cyclic voltammetry (CV) was performed to study the charge storage capacity of the PPy film/MCs formed at different deposition charge densities. The applied potential was swept between −0.8 and 0.4 V at a scan rate of 30 mV/s. The surface area under the CV curve is proportional to the charge storage capacity.[50] As shown in FIG. 5B, the charge storage capacity increased as deposition charge density increased. The charge storage capacity was 2.04±0.78 mC/cm$^2$, 7.03±0.12 mC/cm$^2$, 13.5±0.37 mC/cm$^2$, 27.5±1.29 mC/cm$^2$, 40.5±1.19 mC/cm$^2$, and 48.0±2.79 mC/cm$^2$ for film/MCs formed at deposition charge densities 0 mC/cm$^2$, 30 mC/cm$^2$, 60 mC/cm$^2$, 120 mC/cm$^2$, 180 mC/cm$^2$, and 240 mC/cm$^2$, respectively (FIG. 5D). The increase in deposition charge density yielded a significant increase (p<0.001) in charge storage capacity among all groups. For example, at deposition charge density of 240 mC/cm$^2$, an increase of ~2300% was observed for charge storage capacity in comparison with the bare gold electrode (FIG. 5D).

FIG. 6 demonstrates the in vitro release profile of dexamethasone (DEX) from PPy film/MCs formed at different deposition charge densities. As disclosed herein and depicted in FIGS. 6C-6F, DEX was loaded on the surface of PPy film, outside and inside of PPy MCs. The DEX release was characterized by an initial burst release >65% in 2 hours, followed by a sustained release of ~10-15% over the next 250 hours. The initial burst release is indicated by the intercept of the regression lines in FIG. 6A. The deposition charge density had a significant effect on the initial burst release which increased from 66% at 30 mC/cm$^2$ to 78% at 180 mC/cm$^2$. The increase in the initial burst release with increasing deposition charge density can be attributed to the larger surface area and roughness of the PPy at higher charge density, as shown by the positive correlation in FIG. 6B. As shown in FIG. 6A, the slow release after the first 2 hours exhibited a square root of time dependence for all deposition charge densities. The observed time dependence of the sustained release is consistent with that predicted for diffusion of the drug out of a PPy that is initially impregnated with a uniform concentration of DEX.[53] The rate of sustained release was not significantly affected as the deposition charge density increased from 30 mC/cm$^2$ to 180 mC/cm$^2$, indicating that drug release was dominated by diffusion out of the planar PPy on the 1.0 cm×1.5 cm electrodes used for drug release experiments. This is not surprising considering that the total surface area of PPy MCs changed from 0.23 mm$^2$ to 6.62 mm$^2$ (representing less than 5% of the planar area of the electrode) as the deposition charge density increased from 30 mC/cm$^2$ to 180 mC/cm$^2$. Herein is disclosed a method for the fabrication of conductive PPy MCs with tunable size, surface roughness, electrical properties, and drug release. It is disclosed that an anti-inflammatory drug can be loaded within PPy microstructures and slowly released. The developed PPy MCs may be utilized for applications in the fields of bioelectronics and drug discovery.

Example 2—Materials and Methods

PLGA (85:15 DLG 7E) with an inherent viscosity of 0.6-0.8 dL g$^{-1}$ was purchased from Evonik Industries (Birmingham, AL). Benzyltriethylammonium chloride (BTEAC) and pyrrole (Py, MW 67.09 g mol$^{-1}$) were purchased from Sigma-Aldrich. Poly (sodium-p-styrenesulfonate) (PSS, MW 70 kD) was purchased from Acros-Organics. Chloroform was purchased from SupraSolv Company. N-type Si wafers coated with SiO$_2$ were purchased from University Wafer Company. Dexamethasone 21-phosphate disodium salt, 98% was purchased from Alfa Aesar.

Fabrication of Conductive Substrates:

Au electrodes were fabricated on Si wafers (two circular areas with diameters 1.5 mm and 5.0 mm, connected with a 1 mm×10 mm rectangular area) using electron beam evaporative deposition and laser-cut adhesive masks. A thin (10 nm) layer of titanium was deposited first to facilitate adhesion of the (100 nm) Au layer to the Si wafers.

Fabrication of the Electrosprayed Microspheres:

Homogeneous solutions of 4% (w/w) PLGA and 2% BTEAC (w/w PLGA) were prepared by dissolving 617 mg of PLGA and 12.3 mg of BTEAC in 10 mL of chloroform at room temperature for 12 hours. The mixture was electrosprayed for 25 seconds using an applied field of 100 kV m$^{-1}$ (8 kV applied potential and 8 cm syringe-substrate separation distance), a spinneret gauge of 22, and a flow rate of 500 μl hr$^{-1}$. Temperature and humidity were controlled at 22° C. and 30-34% respectively. The resulting PLGA microspheres deposited onto the 1.5 mm-diameter circular conductive substrate.

Electrochemical Deposition of Conducting Polymers:

Electrochemical polymerization was performed using Autolab PGSTAT 302N (USA METROHM Company) in galvanostatic mode with a two-electrode configuration at room temperature. PLGA microspheres were coated with PPy using a solution containing 0.2 M Py and 0.2 M PSS as dopant, and a 0.5 mA cm$^{-1}$ current density applied over 5 different charge densities. The working electrode was applied to the substrates while the counter electrode was connected to a platinum wire in the Py-PSS solution. After electrodeposition, the PLGA microspheres were dissolved in chloroform overnight to create PPy MCs.

Electrochemical Impedence Spectroscopy (EIS):

EIS measurements were made by using an Autolab PGSTAT 302N and Nova Frequency Response Analyzer software in potentiostatic mode. A solution of 0.1 M phosphate-buffered saline (PBS, pH=7.4) was used as the electrolyte in a three-electrode configuration. The Ag/AgCl reference electrode, Pt foil counter electrode, and fabricated electrodes were immersed in the PBS solution. A sinusoidal a frequency range of 1-10$^4$ Hz.

Cyclic Voltammetry (CV):

A staircase CV was performed using an Autolab PGSTAT 302N in the three-electrode configuration. The potential on the working electrode was swept in the range of −0.8 to 0.4 V vs. the reference electrode at a scan rate of 30 mV$^{s-1}$. In order to calculate the charge storage capacity, the third cycle was used since the readings were observed to be consistently stable after the second cycle. The surface area contained inside the CV curve was determined using OriginLab software, and was used to calculate the charge storage capacity.

Morphology:

To characterize the size of the electrosprayed PLGA microspheres, optical images were taken at 50× magnification (Zeiss Imager Z1, Germany) and analyzed using Axiovision digital processing software. After PPy coating, the conductive microstructures were mounted on aluminum stubs using carbon tape, and sputtered with gold (Denton Sputter Coater) for 40 seconds at 40 mA in order to reduce charging effect. The height, opening diameter, and surface morphology of PPy MCs were characterized using FESEM (FEI Helios NanoLab 660 FIB/FESEM). Image contrast and brightness were enhanced with Adobe Photoshop. The opening areas of PPy MCs were determined using Image J software, and subsequently used to calculate the dimensions of the PPy MCs. AFM in tapping mode using Si tips (force constant 0.4 N m$^{-1}$) was performed on a 25 μm$^2$ area in the same central location on each electrode to determine the root-mean-square (Rq) surface roughness. PPy film thickness was determined using materials confocal microscopy (Zeiss Observer 1, Germany) The thickness of the Cr/Au electrodes on the Si wafers was first determined through a z-stack experiment and quantified using Confomap software (Zeiss, Germany) to determine the step height according to ISO 5436 standards. After deposition at each deposition charge density, the same edge of each electrode was scanned again. The difference in step heights yielded the PPy film thickness (n=5 per deposition charge density).

In Vitro Release Study:

The release of DEX was monitored as a function of incubation time in DI water at 37° C. The number of samples for each group was four (n=5). PPy MCs were fabricated on 1 cm×1.5 cm Au electrodes according to the previously-described protocol of electrospraying and electrodeposition methods [50-52]. DEX (25 mg) was dissolved in 1000 mL of DI water to create solutions with a concentration of 0.025 mg mL$^{-1}$. All samples were sterilized with UV light for 24 hrs. In order to load the samples, 1 mL of DEX solution was pipetted onto each substrate, and degassed using low vacuum (Welch model 2026). Samples were kept in an incubator (Galaxy 170S, New Brunswick) at 37° C. for 24 hrs. This process was performed 3 times. The samples were then immersed in 4 mL DI water. The concentration of released DEX was measured at specific times using UV-Vis spectrophotometry (Molecular Devices SpectaMax M5) at 242 nm wavelength.

Statistical Analysis:

PLGA microspheres were analyzed by focusing on a predetermined central area of each optical image and measuring all microspheres within that area. Standard statistical analysis (Origin 8.6 SRO, Northampton, MA) was performed on these microspheres (n=100-200). PPy MC height and opening diameter were calculated as described, and processed in Origin (n=50 for each coating time). Outliers were removed by use of a Grubbs Test with a significance of 0.05 (standard two-sided analysis). ANOVA was performed on the results for MC opening diameter, MC height, PPy film roughness, impedance, and CV (OriginPro 2015).
Calculations of Surface Area of PPy and MCs:

FIGS. 7A-7C depict a schematic of a sphere indicating the partial element of a PPy wall and the position of R, R', θ1, and θ2. FIG. 7A shows the partial increment of height of a PPy wall (Rdθ) for the angle dθ. FIGS. 7B and 7C depict R, R', θ1, and θ2. The surface area of PPy MCs (S) was calculated according to Equations 5-9:

$$S = \int_{\theta_1}^{\theta_2} 2\pi R' R d\theta = \int_{\theta_1}^{\theta_2} 2\pi (R\sin\theta) R d\theta = -2\pi R^2 (\cos\theta_2 - \cos\theta_1).$$ Equation 5

$$\theta_2 = \text{Arcsin}\left(\frac{R1}{R}\right).$$ Equation 6

$$\theta_1 = \text{Arcsin}\left(\frac{R2}{R}\right).$$ Equation 7

Therefore, the surface area of PPy MCs for different deposition charge densities are given by:

$$S(\text{for 30 and 60 mC/cm}^2) = -4\pi R^2[\cos(\theta 2) - \cos(\theta 1)] \times \text{particles desensity} \times Ae$$ Equation 8.

$$S(\text{for 120 and 180 mC/cm}^2) = -4\pi R^2[\cos(\theta 2) - \cos(\theta 1)] \times \text{particles desensity} \times Ae$$ Equation 9.

Where R1, R2, and R are the radius of opening, Au circle, and PLGA microspheres, respectively. Ae is surface area of electrode, θ1 and θ2 are initial and final growth angles, respectively.

Example 3—Conducting Polymer Nanogrooves

1. General Materials and Method in the Synthesis of Conducting Polymer Nanogrooves Poly(L-lactide) (PLLA, resomer L210) was purchased from Boehringer Ingelheim. Pyrrole (Py, 99% extra pure), Poly(sodium-p-styrenesulfunate) (PSS,MW 70 kD), Benzyl-triethylammoniumchloride (BTEAC, 98%, MW 227.78) and Chloroform (99.8%) were purchased from Acros Organics. 3,4-Ethylenedioxythiophene (EDOT, 97%) was purchased from Alfa Aesar. N-type Silicon wafer coated with $TiO_2$ was purchased from University Wafer Company.

Fabrication of Conductive Substrates:

Au electrodes were fabricated on Si wafers (two circles with radius of 0.75 mm and 2.5 mm connected with a rectangle 1.0×10 mm) using thermal beam evaporative deposition. A thin layer of titanium (10 nm) and Au layer (100 nm) were deposited on Si wafer, respectively.

Fabrication of Electrospun PLLA Nanofibers:

PLLA nanofibers were prepared using electrospinning technique. The solution of PLLA (4% (w/w)) was prepared by dissolving 0.621 g PLLA and 0.012 g BTEAC in 10 ml chloroform at room temperature for 24 hrs. The PLLA nanofibers were electrospun on forty gold-coated silicon wafers using electrospinning apparatus (see FIG. 8). The electrospinning process was carried out using an electrical field of 1 kV/cm (10 kV over 10 cm distance) with flow rate of 400 µl/hr. The tip gauge number 22 was used for the syringe. The speed of rotating wheel was set at 1500 rpm.

Electrochemical Deposition of CPNs:

The electrochemical polymerization was conducted on each electrode by using Autolab PGSTAT128N (MetrohmUSA) in galvanostatic mode with a conventional four electrode configuration at room temperature. 277 µl PY and 824 g PSS, and 42.72 µl EDOT were added separately to in 20 ml deionized water to make 0.2 M PY and 0.2 M PSS (PY:PSS) and 0.02 M EDOT and 0.2 M PSS (EDOT:PSS), respectively. The working and sensing electrode were connected to the Au samples. The reference electrode and counter electrode were connected to platinum wire in the solution. The PY and EDOT were electropolymerized using current density 0.5 mA/cm² on the Au substrates and around the PLLA fibers for 1 min, 2 min, 3 min, and 4 min. The PLLA fibers were then dissolved in chloroform solution for 24 hrs in order to make nanogrooves.

Electrochemical Impedance Spectroscopy (EIS):

The Autolab PGSTAT128N was used to record impedance and Nova Frequency Response Analyzer (Metrohm USA) was used to analysis the impedance of the samples. The solution of 0.1 M PBS (pH 7) was used as an electrolyte in the cell. The reference electrode of Ag/AgCl and the sample, both were soaked in PBS solution. The working electrode and sensing electrode were connected to the sample and the counter electrode was connected to platinum wire in the solution. The range of frequency was set $1-10^5$ Hz with an AC sinusoidal signal, with 10 mV rms amplitude.

Cyclic Voltammetry (CV):

The staircase cyclic voltammetry was utilized for all samples in a four-electrode configuration as described in EIS section. The scan rate of 100 mV/s was applied and the potential was swept between −0.9 V to 0.5 V. To make sure the samples were ionically stabilized, the third cycle was used for measuring the charge storage capacity.

Size, Shape and Morphology Characterization:

Size, shape, and morphology of CPs nanogrooves were studied using the scanning electron microscopy (FEI XL-30FEG) at 25 k× magnification.

2. Results and Discussion

Electrospinning Process and Fabrication of Nanogrooves:

FIG. 8 demonstrates schematic fabrication process of aligned CPNs. PLLA aligned fibers were fabricated through the electrospinning process (FIG. 8A). A typical electrospinning setup for fabrication of aligned fibers consists of a high voltage power supply, a syringe pump, and a rotating collector. The schematic of aligned PLLA fibers on Au coated microelectrode are shown in green color (FIG. 8B). After fabrication of aligned PLLA nanofibers (FIG. 8B), PPY and PEDOT were electropolymerized on Au electrodes to form partially and fully coated CPNTs (FIGS. 8C-8E). The diameter of PLLA fibers were 0.91±0.22 µm.

Figures 9A, 9B, 9C, 9D, 9E, 9F, 9G, 9H:
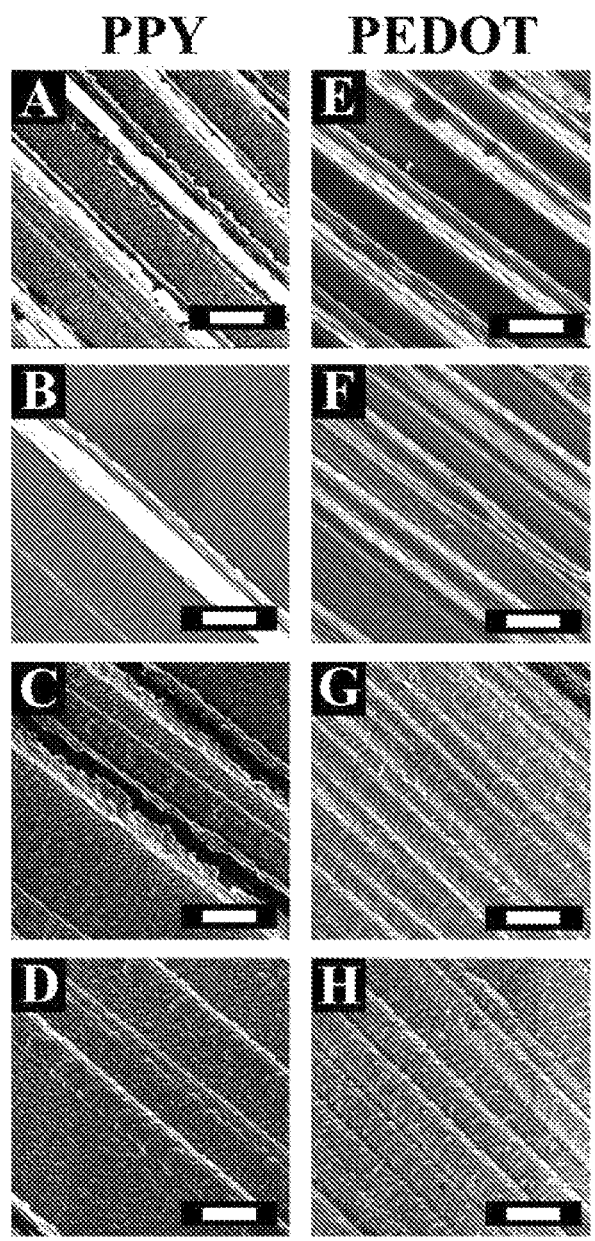
FIGS. 9A-9H show scanning electron micrograph of CPs electropolymerzied partially and fully coated fibers in different time of electrodeposition (i.e., 1 min to 4 min) by (FIGS. 9A-9D) PPY and (FIGS. 9E-9H) PEDOT followed by dissolution of PLLA fibers.

Surface Characterization of CPNTs:

Scanning electron micrographs (SEM) of partially coated fibers (nanogrooves) and fully coated fibers (nanotubes) as functions of electropolymerization time (i.e., 1 min to 4 min) are shown in FIG. 9. FIGS. 9A-9C and FIGS. 9E-9F demonstrate partially coated PLLA fibers (nanogrooves, after dissolving PLLA fibers) of PPY and PEDOT. FIG. 9D and FIGS. 9G-9H show fully coated PLLA fibers (nanotubes, after dissolving PLLA fibers) of PPY and PEDOT. Electrodeposition initiated from the Au surface and progressively CP grew around PPLA nanofibers as the time of deposition increased that is in a good agreement with a previous report (Khorrami et al., 2017).

Figures 10A, 10B:
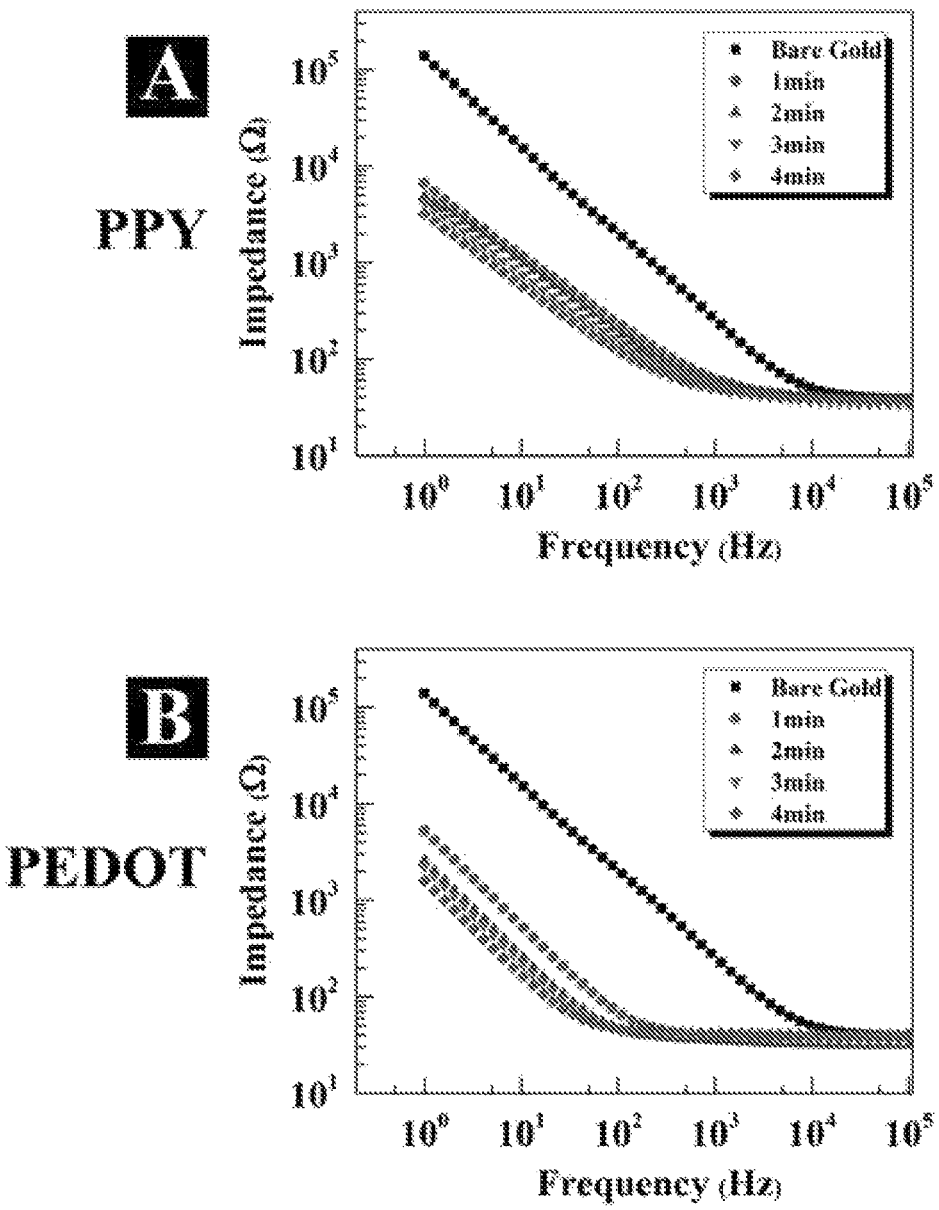
FIGS. 10A & 10B show Bode plot of impedance spectroscopy for (FIG. 10A) PPY and (FIG. 10B) PEDOT over range of 1-105 kHz for bare gold and electropolymerized fibers for deposition time of 1 min to 4 min (bare gold: square, 1 min: circle, 2 min: triangle, 3 min: nabla, and 4 min: diamond).

Electrical Properties of PPY and PEDOT Nanotubes:

Electrochemical impedance spectroscopy (EIS) was utilized to explore conductivity of CPs nanotubes as a function of frequency (i.e., $1-10^5$ Hz). As shown in FIG. 10, the impedance of bare gold (e.g., 282.13±19.71Ω at 1 kHz) was significantly reduced after 4 min electropolymerization of PEDOT nanotube (e.g., 41.87±1.55Ω at 1 kHz) and PPYnanotube (e.g., 58.04±3.42Ω at 1 kHz). As depicted in FIGS. 10A and 10B, the impedance of both PEDOT and PPY decreased as function of electropolymerization time. In addition, PEDOT showed to have lower impedance respect to PPY at entire range of frequency (i.e., 1-$10^5$ Hz). This behavior can be attributed to the higher electrical conductivity of PEDOT than PPY. Furthermore, the bare gold showed capacitor property in frequencies less than 10 kHz and resistor property in frequencies more than 10 kHz. However, the threshold frequency between capacitor and resistor behavior was 1 kHz and 100 Hz for PPY and PEDOT nanotubes, respectively. These results are in a good agreement with previously reported electrical characterization of CPNs (Abidian and Martin, 2008).

Figures 11A, 11B, 11C, 11D, 11E, 11F:
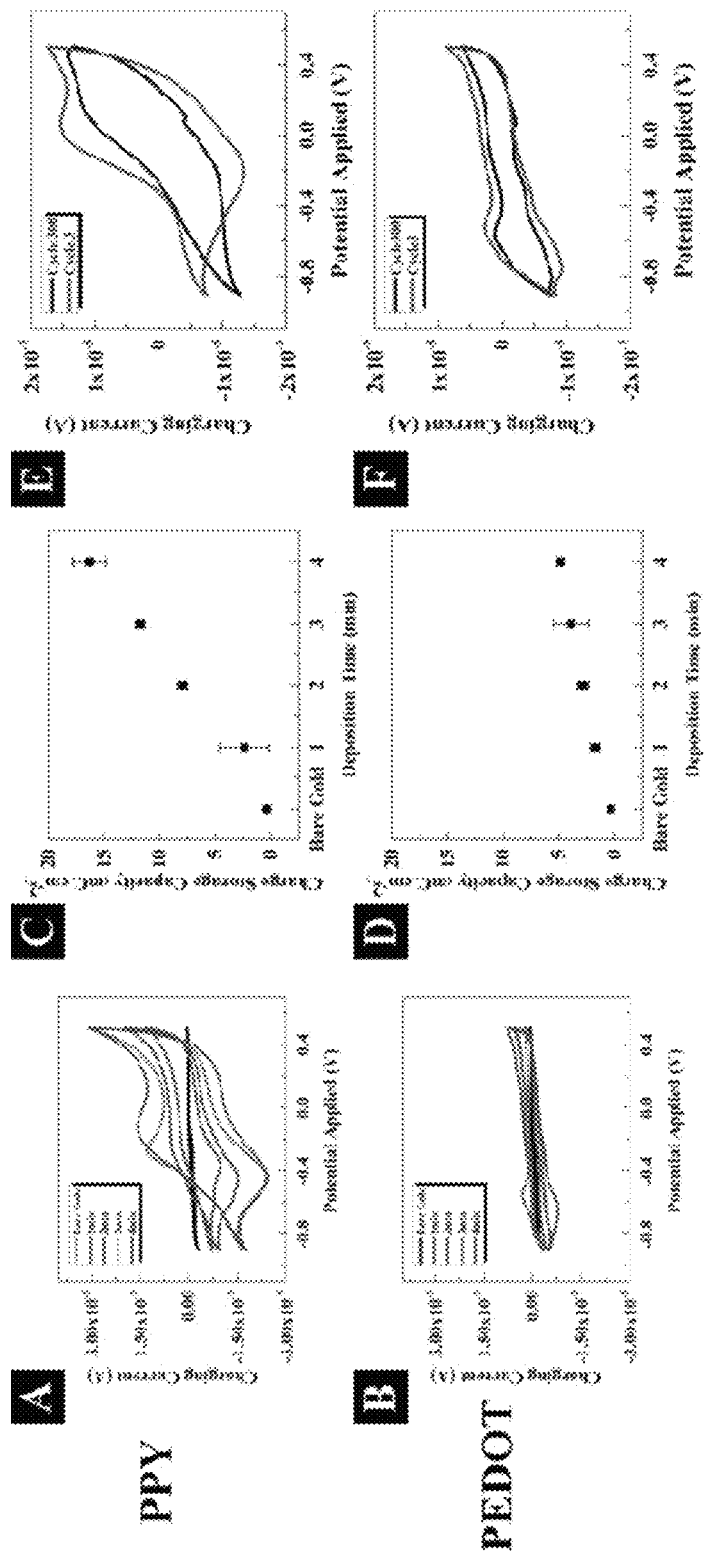
FIGS. 11A-11F show CV of (FIG. 11C) PEDOT and (FIG. 11D) PPy for bare gold and CP coated nanotubes (bare gold: black, 1 min: red, 2 min: blue, 3 min: purple and 4 min: green. The potential was swept from −0.9 V to 0.5 V. The charge storage capacity of (FIG. 11E) PEDOT and (FIG. 11F) PPy correlated with surface area of CV plot for 4 min electrochemical deposition samples. CV as a function of cycle number for (FIG. 11G) PEDOT and (FIG. 11H) PPy for stability test over 300 cycles (scan rate was 10 mV/s). For each experiment 5 samples were used.

FIGS. 11A and 11B show the cyclic voltammetry of the bare gold and CPNs as a function electropolymerization time (i.e., 1 min to 4 min) for PPY and PEDOT nanotubes, respectively. The charge storage capacity (CSC) of PPY and PEDOT were calculated by dividing the integrated surface area of CV graph by scan rate of CV and surface area of the electrode. CSC indicates the capability of CPs to carry the charge at the interface of CP. The CSC of increased from 0.32±0.03 mC/$cm^2$ (bare gold) to 2.39±2.27 mC/$cm^2$, 7.95±0.45 mC/$cm^2$, 11.75±0.44 mC/$cm^2$, 16.32±1.5 mC/$cm^2$ for PPY nanotubes and 1.68±0.38 mC/$cm^2$, 2.85±0.45 mC/$cm^2$, 3.9±1.5 mC/$cm^2$, 4.86±0.24 mC/$cm^2$ for the PEDOT nanotubes as the electrodeposition time increased (1 min, 2 min, 3 min, and 4 min, respectively). However, the CSC of PPY was enhanced more significantly around 80% (i.e., from 3.24×$10^{-1}$±3.27×$10^{-2}$ mC/$cm^2$ to 16.3±1.5 mC/$cm^2$) than PEDOT around 33% (i.e., from 3.24×$10^{-1}$±3.27×$10^{-2}$ mC/$cm^2$ to 4.86±2.44×$10^{-1}$ mC/$cm^2$) (FIGS. 11C and 11D). The integrated surface area under CV curve represents the electroactivity of CPs. To investigate the electroactivity loss of CPNs, the CSC of the $3^{rd}$ and $300^{th}$ cycles of CV were compared. FIGS. 11E and 11F show the CV graph at the cycle of 3 and 300 for PPY and PEDOT nanotubes, respectively. The CSC of PPY from $3^{rd}$ to 300 cycles decreased for 33% (from 10.2 mC/$cm^2$ to 6.8 mC/$cm^2$) and CSC of PEDOT decreased for 30% (from 4.9 mC/$cm^2$ to 3.4 mC/$cm^2$) demonstrating that both PPY and PEDOT nanotubes have the similar electroactivity loss after 300 cycles.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

VI. REFERENCES

The following references, to the extent that they provide exemplary procedural or other details supplementary to those set forth herein, are specifically incorporated herein by reference:

[1] T. Stieglitz, H. Beutel, M. Schuettler, J. U. Meyer, *Biomed. Microdevices* 2000, 2, 283.
[2] P. Fattahi, G. Yang, G. Kim, M. R. Abidian, *Adv. Mater.* 2014, 26, 1846.
[3] M. Gerard, A. Chaubey, B. D. Malhotra, *Biosensors & Bioelectronics* 2002, 17, 345.
[4] A. B. Schwartz, X. T. Cui, D. J. Weber, D. W. Moran, *Neuron* 2006, 52, 205.
[5] D. R. Kipke, W. Shain, G. Buzsaki, E. Fetz, J. M. Henderson, J. F. Hetke, G. Schalk, *Journal of Neuroscience* 2008, 28, 11830.
[6] J. C. Williams, R. L. Rennaker, D. R. Kipke, *Brain Res. Protoc.* 1999, 4, 303.
[7] G. Buzsaki, *Nat. Neurosci.* 2004, 7, 446.
[8] K. L. Drake, K. D. Wise, J. Farraye, D. J. Anderson, S. L. Bement, *IEEE Trans. Biomed. Eng.* 1988, 35, 719.
[9] D. R. Kipke, R. J. Vetter, J. C. Williams, J. F. Hetke, *IEEE Trans. Neural Syst. Rehabil. Eng.* 2003, 11, 151.
[10] P. J. Rousche, R. A. Normann, *J. Neurosci. Methods* 1998, 82, 1.
[11] D. H. Kim, J Viventi, J. J. Amsden, J. L. Xiao, L. Vigeland, Y. S. Kim, J A. Blanco, B. Panilaitis, E. S. Frechette, D. Contreras, D. L. Kaplan, F. G. Omenetto, Y. G. Huang, K. C. Hwang, M. R. Zakin, B. Litt, J. A. Rogers, *Nat. Mater.* 2010, 9, 511.
[12] V. S. Polikov, P. A. Tresco, W. M. Reichert, *J. Neurosci. Methods* 2005, 148, 1.
[13] K. D. Wise, *Ieee Engineering in Medicine and Biology Magazine* 2005, 24, 22.
[14] T. D. Y. Kozai, N. B. Langhals, P. R. Patel, X. P. Deng, H. N. Zhang, K. L. Smith, J. Lahann, N. A. Kotov, D. R. Kipke, *Nat. Mater.* 2012, 11, 1065.
[15] T. D. Y. Kozai, K. Catt, X. Li, Z. V. Gugel, V. T. Olafsson, A. L. Vazquez, X. T. Cui, *Biomaterials* 2015, 37, 25.
[16] J. P. Seymour, D. R. Kipke, *Biomaterials* 2007, 28, 3594.
[17] D. H. Szarowski, M. D. Andersen, S. Retterer, A. J. Spence, M. Isaacson, H. G. Craighead, J. N. Turner, W. Shain, *Brain Res.* 2003, 983, 23.
[18] D. J. Edell, V. V. Toi, V. M. McNeil, L. D. Clark, *IEEE Trans. Biomed. Eng.* 1992, 39, 635.
[19] M. A. L. Nicolelis, D. Dimitrov, J. M. Carmena, R. Crist, G. Lehew, J. D. Kralik, S. P. Wise, *Proc. Natl. Acad. Sci. U.S.A.* 2003, 100, 11041.
[20] X. Y. Cui, J. Wiler, M. Dzaman, R. A. Altschuler, D. C. Martin, *Biomaterials* 2003, 24, 777.
[21] L. Kam, W. Shain, J. N. Turner, R. Bizios, *Biomaterials* 2002, 23, 511.
[22] X. Y. Cui, V. A. Lee, Y. Raphael, J. A. Wiler, J. F. Hetke, D. J. Anderson, D. C. Martin, *J. Biomed. Mater. Res.* 2001, 56, 261.
[23] X. Y. Cui, D. C. Martin, *Sens. Actuator B—Chem.* 2003, 89, 92.
[24] R. A. Green, N. H. Lovell, G. G. Wallace, L. A. Poole-Warren, *Biomaterials* 2008, 29, 3393.
[25] W. Shain, L. Spataro, J. Dilgen, K. Haverstick, S. Retterer, M. Isaacson, M. Saltzman, J. N. Turner, *IEEE Trans. Neural Syst. Rehabil. Eng.* 2003, 11, 186.
[26] L. Spataro, J. Dilgen, S. Retterer, A. J. Spence, M. Isaacson, J. N. Turner, W. Shain, *Exp. Neurol.* 2005, 194, 289.
[27] Z. L. Yue, S. E. Moulton, M. Cook, S. O'Leary, G. G. Wallace, *Adv. Drug Deliv. Rev.* 2013, 65, 559.
[28] R. Wadhwa, C. F. Lagenaur, X. T. Cui, *J. Control. Release* 2006, 110, 531.

[29] R. A. Green, N. H. Lovell, L. A. Poole-Warren, *Acta Biomaterialia* 2010, 6, 63.
[30] D. D. Ateh, H. A. Naysaria, P. Vadgama, *J. R. Soc. Interface* 2006, 3, 741.
[31] N. K. Guimard, N. Gomez, C. E. Schmidt, *Prog. Polym. Sci.* 2007, 32, 876.
[32] Y. Z. Long, M. M. Li, C. Z. Gu, M. X. Wan, J. L. Duvail, Z. W. Liu, Z. Y. Fan, *Prog. Polym. Sci.* 2011, 36, 1415.
[33] G. Malliaras, M. R. Abidian, *Adv. Mater.* 2015, 27, 7492.
[34] A. J. Heeger, *Angew. Chem. —Int. Edit.* 2001, 40, 2591.
[35] R. A. Green, R. T. Hassarati, J. A. Goding, S. Baek, N. H. Lovell, P. J. Martens, L. A. Poole-Warren, *Macromolecular Bioscience* 2012, 12, 494.
[36] B. L. Groenendaal, F. Jonas, D. Freitag, H. Pielartzik, J. R. Reynolds, *Adv. Mater.* 2000, 12, 481.
[37] G. Wallace, G. Spinks, *Soft Matter* 2007, 3, 665.
[38] J. Isaksson, P. Kjall, D. Nilsson, N. D. Robinson, M. Berggren, A. Richter-Dahlfors, *Nat. Mater.* 2007, 6, 673.
[39] M. Berggren, A. Richter-Dahlfors, *Adv. Mater.* 2007, 19, 3201.
[40] E. Smela, *Adv. Mater.* 2003, 15, 481.
[41] M. Liu, N. Xu, W. S. Liu, Z. G. Xie, *Rsc Advances* 2016, 6, 84269.
[42] J. Y. Yang, D. C. Martin, *Sens. Actuator B—Chem.* 2004, 101, 133.
[43] J. G. Hardy, Z. Z. Khaing, S. J. Xin, L. W. Tien, C. E. Ghezzi, D. J. Mouser, R. C. Sukhavasi, R. C. Freda, E. S. Gil, D. L. Kaplan, C. E. Schmidt, *J. Biomater. Sci. —Polym. Ed.* 2015, 26, 1327.
[44] L. T. Qu, G. Q. Shi, J. Y. Yuan, G. Y. Han, F. Chen, *J. Electroanal. Chem.* 2004, 561, 149.
[45] V. Bajpai, P. G. He, L. M. Dai, *Adv. Funct. Mater.* 2004, 14, 145.
[46] J. Y. Lee, C. A. Bashur, A. S. Goldstein, C. E. Schmidt, *Biomaterials* 2009, 30, 4325.
[47] M. R. Abidian, D. C. Martin, *Biomaterials* 2008, 29, 1273.
[48] J. L. Bredas, G. B. Street, *Accounts Chem. Res.* 1985, 18, 309.
[49] A. G. MacDiarmid, *Angew. Chem. —Int. Edit.* 2001, 40, 2581.
[50] M. R. Abidian, D. C. Martin, *Adv. Funct. Mater.* 2009, 19, 573.
[51] M. R. Abidian, D. H. Kim, D. C. Martin, *Adv. Mater.* 2006, 18, 405.
[52] G. Yang, K. L. Kampstra, M. R. Abidian, *Adv. Mater.* 2014, 26, 4954.
[53] P. Fattahi, A. Borhan, M. R. Abidian, *Adv. Mater.* 2013, 25, 4555.
[54] S. Takeuchi, P. Garstecki, D. B. Weibel, G. M. Whitesides, *Adv. Mater.* 2005, 17, 1067.
[55] X. L. Luo, X. T. Cui, *Electrochem. Commun.* 2009, 11, 402.
[56] M. Khorrami, M. Antensteiner, F. Fallahianbijan, A. Borhan, and M. R. Abidian, in 2017 *39th Annual International Conference of the IEEE Engineering in Medicine and Biology Society (EMBC)*, 2017, pp. 1869-1872.
[57] M. R. Abidian and D. C. Martin, *Biomaterials*, 2008, 29, 1273.
[58] L. R. Hochberg et al., Nature, Article vol. 442, p. 164, 07/13/online 2006.
[59] M. Antensteiner, M. Khorrami, F. Fallahianbijan, A. Borhan, and M. R. Abidian, *Advanced Materials, vol.* 29, no. 39, pp. 1702576-n/a, 2017, Art. no. 1702576.
[60] D. H. Hubel, *Science, vol.* 125, no. 3247, pp. 549-550, 1957.
[61] D. R. Kipke, R. J. Vetter, J. C. Williams, and J. F. Hetke, (in English), *IEEE Transactions on Neural Systems and Rehabilitation Engineering*, Article; Proceedings Paper vol. 11, no. 2, pp. 151-155, June 2003.
[62] T. D. Y. Kozai et al., *Biomaterials*, vol. 37, pp. 25-39, 2015 Jan. 1, 2015.
[63] M. R. Abidian, K. A. Ludwig, T. C. Marzullo, D. C. Martin, and D. R. Kipke, *Advanced Materials*, vol. 21, no. 37, pp. 3764-3770, 2009.
[64] M. R. Abidian, J. M. Corey, D. R. Kipke, and D. C. Martin, *Small*, vol. 6, no. 3, pp. 421-429, 2010.
[65] R. Green and M. R. Abidian, *Advanced Materials*, vol. 27, no. 46, pp. 7620-7637, 2015.
[66] L. Groenendaal, G. Zotti, P. H. Aubert, S. M. Waybright, and J. R. Reynolds, *Advanced Materials*, vol. 15, no. 11, pp. 855-879, 2003.
[67] M. R. Abidian, D. H. Kim, and D. C. Martin, *Advanced Materials*, vol. 18, no. 4, pp. 405-409, 2006.

What is claimed is:

1. A method of preparing a conducting polymer coated microstructure comprising:
   (A) obtaining a conductive surface and applying by electrospray a non-conductive polymer to obtain a non-conductive polymer coated surface; and
   (B) polymerizing a monomer using electrochemical polymerization to form a conductive polymer onto the non-conductive polymer coated surface to obtain a conductive polymer coated surface;
   wherein the conducting polymer coated microstructure is a sphere or cup.

2. The method of either claim 1, wherein the conductive surface is a metal electrode.

3. The method of claim 2, wherein the metal electrode is a gold electrode.

4. The method according to claim 1, wherein the non-conductive polymer is an electrosprayable polymer.

5. The method according to claim 1, wherein the conductive polymer is a poly(pyrrole).

6. The method according to claim 1, wherein the conductive polymer is a poly(thiophene), poly(acetylene), polyphenylene sulfide, or poly(aniline).

7. The method according to claim 1, wherein the conductive polymer is polymerized around the non-conductive polymer.

8. The method according to claim 1, further comprising removing the non-conductive polymer from the conductive polymer coated surface to obtain a conducting polymer coated microstructure.

9. The method according to claim 1, wherein the application of the non-conductive polymer comprises depositing the non-conductive polymer.

10. The method according to claim 1, wherein the electrochemical polymerization comprises using an electrical source in the galvanostatic mode.

11. The method according to claim 1, wherein the conducting polymer coated microstructure has a film thickness from about 25 nm to about 1000 nm.

12. The method according to claim 1, wherein the conducting polymer coated microstructure has an opening diameter from about 0.5 µm to about 5 µm.

13. The method according to claim 1, wherein the conducting polymer coated microstructure has no opening.

14. The method according to claim 1, wherein the conducting polymer coated microstructure has a surface roughness from about 2.5 nm to about 40 nm.

15. The method according to claim 1, wherein the conducting polymer coated microstructure has a height from about 0.05 μm to about 5 μm.

16. The method according to claim 1, wherein the conducting polymer coated microstructure has a surface area from about 0.1 mm$^2$ to about 25 mm$^2$.

17. The method according to claim 1, wherein the conducting polymer coated microstructure has an impedance from about 10 Ω to about 1000 Ω.

18. The method according to claim 1, wherein the conducting polymer coated microstructure has a charge storage capacity from about 0.5 mC/cm$^2$ to about 75 mC/cm$^2$.

* * * * *